US012213159B2

(12) United States Patent
Zhou et al.

(10) Patent No.: US 12,213,159 B2
(45) Date of Patent: Jan. 28, 2025

(54) TECHNIQUES FOR MEASUREMENT OF SIGNAL-TO-INTERFERENCE-PLUS-NOISE RATIO (SINR)

(71) Applicant: QUALCOMM Incorporated, San Diego, CA (US)

(72) Inventors: Yan Zhou, San Diego, CA (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/308,720

(22) Filed: May 5, 2021

(65) Prior Publication Data

US 2021/0352651 A1      Nov. 11, 2021

Related U.S. Application Data

(60) Provisional application No. 63/021,652, filed on May 7, 2020.

(51) Int. Cl.
*H04W 72/51*   (2023.01)
*H04L 5/00*    (2006.01)
(Continued)

(52) U.S. Cl.
CPC .......... *H04W 72/51* (2023.01); *H04L 5/0048* (2013.01); *H04W 24/08* (2013.01); *H04W 56/001* (2013.01)

(58) Field of Classification Search
CPC ... H04L 5/0048; H04L 5/0051; H04L 5/0053; H04W 24/08; H04W 56/001; H04W 72/042
See application file for complete search history.

(56) References Cited

U.S. PATENT DOCUMENTS

2019/0229781 A1*   7/2019   Jin ................... H04B 7/0628
2020/0007299 A1*   1/2020   Han .................. H04W 72/042
(Continued)

FOREIGN PATENT DOCUMENTS

| CN | 108418667 A    | 8/2018 |
| WO | 2017164590 A1  | 9/2017 |
| WO | 2020050683 A1  | 3/2020 |

OTHER PUBLICATIONS

Huawei., et al., "Discussion on L1-SINR Measurements for NR eMIMO", 3GPP TSG-RAN WG4 Meeting #92bis, 3GPP Draft, R4-1911919, 3rd Generation Partnership Project (3GPP), Mobile Competence Centre, 650, Route Des Lucioles, F-06921 Sophia-Antipolis Cedex, France, vol. RAN WG4, No. Chongqing, China, Oct. 14, 2019-Oct. 18, 2019, Oct. 4, 2019 (Oct. 4, 2019), 4 Pages, XP051806659.

(Continued)

*Primary Examiner* — Michael Thier
*Assistant Examiner* — Prince A Mensah
(74) *Attorney, Agent, or Firm* — Patterson & Sheridan LLP

(57) ABSTRACT

Certain aspects of the present disclosure provide techniques for configuration of resources to determine signal-to-interference-plus-noise ratio (SINR). A method that may be performed by a user equipment (UE) includes transmitting, to a base station (BS), an indication that the UE is configured with at least one capability to support a combination of a channel measurement resource (CMR) and at least one interference measurement resource (IMR), if group based beam reporting is configured, receiving a reference signal (RS) resource setting for the CMR to perform channel measurement based, at least in part, on the capability of the UE, receiving at least one RS resource setting for the at least one IMR to perform interference measurement based, at least in part, on the capability of the UE, determining at least (Continued)

one signal-to-interference-plus-noise ratio (SINR) parameter based on results of performing the channel measurement and the interference measurement, and transmitting the SINR parameter to the BS.

24 Claims, 22 Drawing Sheets

(51) Int. Cl.
*H04W 24/08* (2009.01)
*H04W 56/00* (2009.01)

(56) References Cited

U.S. PATENT DOCUMENTS

| | | | |
|---|---|---|---|
| 2020/0235832 A1 | 7/2020 | Lee et al. | |
| 2020/0304257 A1* | 9/2020 | Kim | H04L 5/0053 |
| 2022/0140960 A1* | 5/2022 | Gao | H04L 5/0023 370/336 |
| 2022/0279370 A1* | 9/2022 | Guan | H04B 7/0695 |
| 2022/0286175 A1* | 9/2022 | Matsumura | H04B 7/0695 |

OTHER PUBLICATIONS

International Search Report and Written Opinion—PCT/US2021/031035—ISA/EPO—Aug. 30, 2021.

NTT Docomo, Inc: "Discussion on Multi-Beam Enhancement", 3GPP Draft, 3GPP TSG RAN WG1 Meeting #99, R1-1912894, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 18, 2019-Nov. 22, 2019, Nov. 8, 2019 (Nov. 8, 2019), XP051820230, pp. 1-15.

* cited by examiner

900

905

TRANSMIT, BY A BASE STATION (BS), TO A USER EQUIPMENT (UE), A FIRST NON-ZERO POWER (NZP) REFERENCE SIGNAL (RS) RESOURCE SETTING INDICATING AT LEAST ONE CHANNEL MEASUREMENT RESOURCE (CMR), A ZERO POWER (ZP) RS RESOURCE SETTING INDICATING AT LEAST ONE ZP INTERFERENCE MEASUREMENT RESOURCE (IMR), AND A SECOND NZP RS RESOURCE SETTING INDICATING AT LEAST ONE NZP IMR, WHEREIN A QUASI-CO LOCATION (QCL) ASSUMPTION FOR THE AT LEAST ONE ZP IMR AND THE AT LEAST ONE NZP IMR IS DETERMINED BASED ON A RS CONFIGURED FOR THE AT LEAST ONE CMR

910

RECEIVE, BY THE BS, AT LEAST ONE SIGNAL-TO-INTERFERENCE-PLUS-NOISE RATIO (SINR) PARAMETER BASED ON RESULTS OF CHANNEL MEASUREMENT PERFORMED BASED ON THE AT LEAST ONE CMR, ZP INTERFERENCE MEASUREMENT PERFORMED BASED, AT LEAST IN PART, ON THE AT LEAST ONE ZP IMR THE QCL ASSUMPTION, AND NZP INTERFERENCE MEASUREMENT PERFORMED BASED, AT LEAST IN PART, ON THE AT LEAST ONE NZP IMR AND THE QCL ASSUMPTION

TRANSMIT, BY A BASE STATION (BS), TO A USER-EQUIPMENT (UE), A FIRST NON-ZERO POWER (NZP) REFERENCE SIGNAL (RS) RESOURCE SETTING INDICATING AT LEAST ONE CHANNEL MEASUREMENT RESOURCE (CMR), A ZERO POWER (ZP) RS RESOURCE SETTING INDICATING AT LEAST ONE ZP INTERFERENCE MEASUREMENT RESOURCE (IMR), AND A SECOND NZP RS RESOURCE SETTING INDICATING AT LEAST ONE NZP IMR, THE FIRST NZP RS RESOURCE SETTING INDICATING THE SAME NUMBER OF RESOURCES AS THE SECOND NZP RS RESOURCE SETTING

1210

RECEIVE, BY THE BS, AT LEAST ONE SIGNAL-TO-INTERFERENCE-PLUS-NOISE RATIO (SINR) PARAMETER BASED ON RESULTS OF CHANNEL MEASUREMENT PERFORMED BASED ON THE AT LEAST ONE CMR, ZP INTERFERENCE MEASUREMENT PERFORMED BASED ON THE AT LEAST ONE ZP IMR, AND NZP INTERFERENCE MEASUREMENT PERFORMED BASED ON THE AT LEAST ONE NZP IMR

TRANSMIT, BY A BASE STATION (BS), TO A USER EQUIPMENT (UE), A FIRST NON-ZERO POWER (NZP) REFERENCE SIGNAL (RS) RESOURCE SETTING INDICATING AT LEAST ONE CHANNEL MEASUREMENT RESOURCE (CMR), A ZERO POWER (ZP) RS RESOURCE SETTING INDICATING AT LEAST ONE ZP INTERFERENCE MEASUREMENT RESOURCE (IMR), AND A SECOND NZP RS RESOURCE SETTING INDICATING MULTIPLE NZP IMRS, THE CMR OR THE ZP IMR COMPRISING A COMMON RESOURCE THAT IS COMMON FOR DETERMINATION OF AT LEAST ONE SIGNAL-TO-INTERFERENCE-PLUS-NOISE RATIO (SINR) PARAMETER

1510

RECEIVE, BY THE BS, THE AT LEAST ONE SINR PARAMETER DETERMINED BASED ON THE COMMON RESOURCE

TRANSMIT, BY A BASE STATION (BS), TO A USER EQUIPMENT (UE), A CONFIGURATION OF A SINGLE CHANNEL MEASUREMENT RESOURCE (CMR) SETTING AND A HIGHER LAYER PARAMETER INDICATING THAT REPETITION IS ENABLED FOR THE SINGLE CMR SETTING

1810

RECEIVE, BY THE BS, A SIGNAL TO INTERFERENCE NOISE RATIO (SINR) PARAMETER BASED ON RESULTS OF CHANNEL MEASUREMENT AND INTERFERENCE MEASUREMENT PERFORMED BASED, AT LEAST IN PART, ON THE SINGLE CMR SETTING AND THE HIGHER LAYER PARAMETER

FIG. 18

TECHNIQUES FOR MEASUREMENT OF SIGNAL-TO-INTERFERENCE-PLUS-NOISE RATIO (SINR)

CROSS-REFERENCE TO RELATED APPLICATION(S)

This application claims benefit of and priority to U.S. Provisional Application No. 63/021,652 filed May 7, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for channel measurement.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved signal-to-interference-plus-noise ratio (SINR) determination.

Certain aspects of the present disclosure are generally directed to a method for wireless communication by a user equipment (UE), including: transmitting, to a base station (BS), an indication that the UE is configured with at least one capability to support a combination of a channel measurement resource (CMR) and at least one interference measurement resource (IMR), if group based beam reporting is configured; receiving a reference signal (RS) resource setting for the CMR to perform channel measurement based, at least in part, on the capability of the UE; receiving at least one RS resource setting for the at least one IMR to perform interference measurement based, at least in part, on the capability of the UE; determining at least one SINR parameter based on results of performing the channel measurement and the interference measurement; and transmitting the SINR parameter to the BS.

Certain aspects of the present disclosure are generally directed to a method for wireless communication by a BS, including: receiving, an indication that a UE is configured with at least one capability to support a combination of a CMR and at least one IMR, when group based beam reporting is configured at the UE; transmitting, based, at least in part, on the capability of the UE, an RS resource setting for the CMR for the UE to perform channel measurement; transmitting, based, at least in part, on the capability of the UE, at least one RS resource setting for the at least one IMR for the UE to perform interference measurement; and receiving at least one SINR parameter determined based on results of the UE performing the channel measurement and the interference measurement.

Certain aspects of the present disclosure are generally directed to a method for wireless communication by a UE, including: receiving, from a BS, a first non-zero power (NZP) RS resource setting indicating at least one CMR, a zero power (ZP) RS resource setting indicating at least one ZP IMR, and a second NZP RS resource setting indicating at least one NZP IMR; determining a quasi-co location (QCL) assumption for the at least one ZP IMR and the at least one NZP IMR, based on an RS configured for the at least one CMR; determining at least one SINR parameter based on results of performing the channel measurement, the ZP interference measurement based, at least in part, on the QCL assumption, and the NZP interference measurement based, at least in part, on the QCL assumption; and transmitting the SINR parameter to the BS.

Certain aspects of the present disclosure are generally directed to a method for wireless communication by a BS, including: transmitting, to a UE, a first NZP RS resource setting indicating at least one CMR, a ZP RS resource setting indicating at least one ZP IMR, and a second NZP RS resource setting indicating at least one NZP IMR, where a QCL assumption for the at least one ZP IMR and the at least one NZP IMR is determined based on an RS configured for the at least one CMR; and receiving at least one SINR parameter based on results of channel measurement performed based on the at least one CMR, ZP interference measurement performed based, at least in part, on the at least one ZP IMR and the QCL assumption, and NZP interference measurement performed based, at least in part, on the at least one NZP IMR and the QCL assumption.

Certain aspects of the present disclosure are generally directed to a method for wireless communication by a UE, including: receiving, from a BS, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; performing channel measurement based on the at least one CMR; determining at least one SINR parameter based on results of performing the channel measurement, the ZP interference measurement, and the NZP interference measurement; and transmitting the at least one SINR parameter to the BS.

Certain aspects of the present disclosure are generally directed to a method for wireless communication by a BS, including: transmitting, to a UE, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; and receiving at least one signal-to-interference-plus-noise ratio (SINR) parameter based on results of channel measurement performed based on the at least one CMR, ZP interference measurement performed based on the at least one ZP IMR, and NZP interference measurement performed based on the at least one NZP IMR.

Certain aspects of the present disclosure are generally directed to a method for wireless communication by a UE, including: receiving, from a BS, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; determining the at least one SINR parameter based on the common resource; and transmitting the at least one SINR parameter to the BS.

Certain aspects of the present disclosure are generally directed to a method for wireless communication by a BS, including: transmitting, to a UE, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SIN) parameter; and receiving the at least one SINR parameter determined based on the common resource.

Certain aspects of the present disclosure are generally directed to a method for wireless communication by a UE, including: receiving, from a BS, a configuration of a single CMR setting and a higher layer parameter indicating that repetition is enabled for the single CMR setting; determining a SINR parameter based on results of performing the channel measurement and the interference measurement based, at least in part, on the higher layer parameter; and transmitting the SINR parameter to the BS.

Certain aspects of the present disclosure are generally directed to a method for wireless communication by a BS, including: transmitting, to a UE, a configuration of a single CMR setting and a higher layer parameter indicating that repetition is enabled for the single CMR setting; and receiving a SINR parameter based on results of channel measurement and interference measurement performed based, at least in part, on the single CMR setting and the higher layer parameter.

Certain aspects of the present disclosure can be implemented in an apparatus for wireless communication by a UE. The apparatus generally includes a memory and one or more processors coupled to the memory, the memory and the one or more processors being configured to: transmit, to a BS, an indication that the UE is configured with at least one capability to support a combination of a CMR and at least one IMR, if group based beam reporting is configured; receive an RS resource setting for the CMR to perform channel measurement based, at least in part, on the capability of the UE; receive at least one RS resource setting for the at least one IMR to perform interference measurement based, at least in part, on the capability of the UE; determine at least one SINR parameter based on results of performing the channel measurement and the interference measurement; and transmit the SINR parameter to the BS.

Certain aspects of the present disclosure can be implemented in an apparatus for wireless communication by a BS. The apparatus generally includes a memory and one or more processors coupled to the memory, the memory and the one or more processors being configured to: receive, an indication that a UE is configured with at least one capability to support a combination of a CMR and at least one IMR, when group based beam reporting is configured at the UE; transmit, based, at least in part, on the capability of the UE, an RS resource setting for the CMR for the UE to perform channel measurement; transmit, based, at least in part, on the capability of the UE, at least one RS resource setting for the at least one IMR for the UE to perform interference measurement; and receive at least one SINR parameter determined based on results of the UE performing the channel measurement and the interference measurement.

Certain aspects of the present disclosure can be implemented in an apparatus for wireless communication by a UE. The apparatus generally includes a memory and one or more processors coupled to the memory, the memory and the one or more processors being configured to: receive, from a BS, a first NZP RS resource setting indicating at least one CMR, a ZP RS resource setting indicating at least one ZP IMR, and a second NZP RS resource setting indicating at least one NZP IMR; determine a QCL assumption for the at least one ZP IMR and the at least one NZP IMR, based on an RS configured for the at least one CMR; determine at least one SINR parameter based on results of performing the channel measurement, the ZP interference measurement based, at least in part, on the QCL assumption, and the NZP interference measurement based, at least in part, on the QCL assumption; and transmit the SINR parameter to the BS.

Certain aspects of the present disclosure can be implemented in an apparatus for wireless communication by a BS. The apparatus generally includes a memory and one or more processors coupled to the memory, the memory and the one or more processors being configured to: transmit, to a UE, a first NZP RS resource setting indicating at least one CMR, a ZP RS resource setting indicating at least one ZP IMR, and a second NZP RS resource setting indicating at least one NZP IMR, where a QCL assumption for the at least one ZP IMR and the at least one NZP IMR is determined based on an RS configured for the at least one CMR; and receive at least one SINR parameter based on results of channel measurement performed based on the at least one CMR, ZP interference measurement performed based, at least in part, on the at least one ZP IMR and the QCL assumption, and NZP interference measurement performed based, at least in part, on the at least one NZP IMR and the QCL assumption.

Certain aspects of the present disclosure can be implemented in an apparatus for wireless communication by a UE. The apparatus generally includes a memory and one or more processors coupled to the memory, the memory and the one or more processors being configured to: receive, from a BS, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; perform channel measurement based on the at least one CMR; determine at least one SINR parameter based on results of performing the channel measurement, the ZP interference measurement, and the NZP interference measurement; and transmit the at least one SINR parameter to the BS.

Certain aspects of the present disclosure can be implemented in an apparatus for wireless communication by a BS. The apparatus generally includes a memory and one or more processors coupled to the memory, the memory and the one or more processors being configured to: transmit, to a UE, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; and receive at least one SINR parameter based on results of channel measurement performed based on the at least one CMR, ZP interference measurement performed based on the at least one ZP IMR, and NZP interference measurement performed based on the at least one NZP IMR.

Certain aspects of the present disclosure can be implemented in an apparatus for wireless communication by a UE. The apparatus generally includes a memory and one or more processors coupled to the memory, the memory and the one or more processors being configured to: receive, from a BS, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; determine the at least one SINR parameter based on the common resource; and transmit the at least one SINR parameter to the BS.

Certain aspects of the present disclosure can be implemented in an apparatus for wireless communication by a BS. The apparatus generally includes a memory and one or more processors coupled to the memory, the memory and the one or more processors being configured to: transmit, to a UE, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; and receive the at least one SINR parameter determined based on the common resource.

Certain aspects of the present disclosure can be implemented in an apparatus for wireless communication by a UE. The apparatus generally includes a memory and one or more processors coupled to the memory, the memory and the one or more processors being configured to: receive, from a BS, a configuration of a single CMR setting and a higher layer parameter indicating that repetition is enabled for the single CMR setting; determine a SINR parameter based on results of performing the channel measurement and the interference measurement based, at least in part, on the higher layer parameter; and transmit the SINR parameter to the BS.

Certain aspects of the present disclosure can be implemented in an apparatus for wireless communication by a BS. The apparatus generally includes a memory and one or more processors coupled to the memory, the memory and the one or more processors being configured to: transmit, to a UE, a configuration of a single CMR setting and a higher layer parameter indicating that repetition is enabled for the single CMR setting; and receive a SINR parameter based on results of channel measurement and interference measurement performed based, at least in part, on the single CMR setting and the higher layer parameter.

Certain aspects of the present disclosure can be implemented in an apparatus for wireless communication by a UE. The apparatus generally includes means for transmitting, to a BS, an indication that the UE is configured with at least one capability to support a combination of a CMR and at least one IMR, if group based beam reporting is configured; means for receiving an RS resource setting for the CMR to perform channel measurement based, at least in part, on the capability of the UE; means for receiving at least one RS resource setting for the at least one IMR to perform interference measurement based, at least in part, on the capability of the UE; means for determining at least one SINR parameter based on results of performing the channel measurement and the interference measurement; and means for transmitting the SINR parameter to the BS.

Certain aspects of the present disclosure can be implemented in an apparatus for wireless communication by a BS. The apparatus generally includes means for receiving, an indication that a UE is configured with at least one capability to support a combination of a CMR and at least one IMR, when group based beam reporting is configured at the UE; means for transmitting, based, at least in part, on the capability of the UE, an RS resource setting for the CMR for the UE to perform channel measurement; means for transmitting, based, at least in part, on the capability of the UE, at least one RS resource setting for the at least one IMR for the UE to perform interference measurement; and means for receiving at least one SINR parameter determined based on results of the UE performing the channel measurement and the interference measurement.

Certain aspects of the present disclosure can be implemented in an apparatus for wireless communication by a UE. The apparatus generally includes means for receiving, from a BS, a first NZP RS resource setting indicating at least one CMR, a ZP RS resource setting indicating at least one ZP IMR, and a second NZP RS resource setting indicating at least one NZP IMR; means for determining a QCL assumption for the at least one ZP IMR and the at least one NZP IMR, based on an RS configured for the at least one CMR; means for determining at least one SINR parameter based on results of performing the channel measurement, the ZP interference measurement based, at least in part, on the QCL assumption, and the NZP interference measurement based, at least in part, on the QCL assumption; and means for transmitting the SINR parameter to the BS.

Certain aspects of the present disclosure can be implemented in an apparatus for wireless communication by a BS. The apparatus generally includes means for transmitting, to a UE, a first NZP RS resource setting indicating at least one CMR, a ZP RS resource setting indicating at least one ZP IMR, and a second NZP RS resource setting indicating at least one NZP IMR, where a QCL assumption for the at least one ZP IMR and the at least one NZP IMR is determined based on an RS configured for the at least one CMR; and means for receiving at least one SINR parameter based on results of channel measurement performed based on the at least one CMR, ZP interference measurement performed based, at least in part, on the at least one ZP IMR and the QCL assumption, and NZP interference measurement performed based, at least in part, on the at least one NZP IMR and the QCL assumption.

Certain aspects of the present disclosure can be implemented in an apparatus for wireless communication by a UE. The apparatus generally includes means for receiving, from a BS, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; means for performing channel measurement based on the at least one CMR; means for determining at least one SINR parameter based on results of performing the channel measurement, the ZP interference measurement, and the NZP interference measurement; and means for transmitting the at least one SINR parameter to the BS.

Certain aspects of the present disclosure can be implemented in an apparatus for wireless communication by a BS. The apparatus generally includes means for transmitting, to a UE, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; and means for receiving at least one SINR parameter based on results of channel measurement performed based on the at least one CMR, ZP interference measurement performed based on the at least one ZP IMR, and NZP interference measurement performed based on the at least one NZP IMR.

Certain aspects of the present disclosure can be implemented in an apparatus for wireless communication by a UE. The apparatus generally includes means for receiving, from a BS, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; means for determining the at least one SINR parameter based on the common resource; and means for transmitting the at least one SINR parameter to the BS.

Certain aspects of the present disclosure can be implemented in an apparatus for wireless communication by a BS. The apparatus generally includes means for transmitting, to a UE, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; and means for receiving the at least one SINR parameter determined based on the common resource.

Certain aspects of the present disclosure can be implemented in an apparatus for wireless communication by a UE. The apparatus generally includes means for receiving, from a BS, a configuration of a single CMR setting and a higher layer parameter indicating that repetition is enabled for the single CMR setting; means for determining a SINR parameter based on results of performing the channel measurement and the interference measurement based, at least in part, on the higher layer parameter; and means for transmitting the SINR parameter to the BS.

Certain aspects of the present disclosure can be implemented in an apparatus for wireless communication by a BS. The apparatus generally includes means for transmitting, to a UE, a configuration of a single CMR setting and a higher layer parameter indicating that repetition is enabled for the single CMR setting; and means for receiving a SINR parameter based on results of channel measurement and interference measurement performed based, at least in part, on the single CMR setting and the higher layer parameter.

Certain aspects of the present disclosure can be implemented in a computer-readable medium having instructions stored thereon to cause a UE to: transmit, to a BS, an indication that the UE is configured with at least one capability to support a combination of a CMR and at least one IMR, if group based beam reporting is configured; receive an RS resource setting for the CMR to perform channel measurement based, at least in part, on the capability of the UE; receive at least one RS resource setting for the at least one IMR to perform interference measurement based, at least in part, on the capability of the UE; determine at least one SINR parameter based on results of performing the channel measurement and the interference measurement; and transmit the SINR parameter to the BS.

Certain aspects of the present disclosure can be implemented in a computer-readable medium having instructions stored thereon to cause a BS to: receive, an indication that a UE is configured with at least one capability to support a combination of a CMR and at least one IMR, when group based beam reporting is configured at the UE; transmit, based, at least in part, on the capability of the UE, an RS resource setting for the CMR for the UE to perform channel measurement; transmit, based, at least in part, on the capability of the UE, at least one RS resource setting for the at least one IMR for the UE to perform interference measurement; and receive at least one SINR parameter determined based on results of the UE performing the channel measurement and the interference measurement.

Certain aspects of the present disclosure can be implemented in a computer-readable medium having instructions stored thereon to cause a UE to: receive, from a BS, a first NZP RS resource setting indicating at least one CMR, a ZP RS resource setting indicating at least one ZP IMR, and a second NZP RS resource setting indicating at least one NZP IMR; determine a QCL assumption for the at least one ZP IMR and the at least one NZP IMR, based on an RS configured for the at least one CMR; determine at least one SINR parameter based on results of performing the channel measurement, the ZP interference measurement based, at least in part, on the QCL assumption, and the NZP interference measurement based, at least in part, on the QCL assumption; and transmit the SINR parameter to the BS.

Certain aspects of the present disclosure can be implemented in a computer-readable medium having instructions stored thereon to cause a BS to: transmit, to a UE, a first NZP RS resource setting indicating at least one CMR, a ZP RS resource setting indicating at least one ZP IMR, and a second NZP RS resource setting indicating at least one NZP IMR, where a QCL assumption for the at least one ZP IMR and the at least one NZP IMR is determined based on an RS configured for the at least one CMR; and receive at least one SINR parameter based on results of channel measurement performed based on the at least one CMR, ZP interference measurement performed based, at least in part, on the at least one ZP IMR and the QCL assumption, and NZP interference measurement performed based, at least in part, on the at least one NZP IMR and the QCL assumption.

Certain aspects of the present disclosure can be implemented in a computer-readable medium having instructions stored thereon to cause a UE to: receive, from a BS, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting;

perform channel measurement based on the at least one CMR; determine at least one SINR parameter based on results of performing the channel measurement, the ZP interference measurement, and the NZP interference measurement; and transmit the at least one SINR parameter to the BS.

Certain aspects of the present disclosure can be implemented in a computer-readable medium having instructions stored thereon to cause a BS to: transmit, to a UE, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting; and receive at least one SINR parameter based on results of channel measurement performed based on the at least one CMR, ZP interference measurement performed based on the at least one ZP IMR, and NZP interference measurement performed based on the at least one NZP IMR.

Certain aspects of the present disclosure can be implemented in a computer-readable medium having instructions stored thereon to cause a UE to: receive, from a BS, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; determine the at least one SINR parameter based on the common resource; and transmit the at least one SINR parameter to the BS.

Certain aspects of the present disclosure can be implemented in a computer-readable medium having instructions stored thereon to cause a BS to transmit, to a UE, a first NZP RS resource setting indicating at least one CMR, a ZP RS resource setting indicating at least one ZP IMR, and a second NZP RS resource setting indicating multiple NZP IMRs, the CMR or the ZP IMR including a common resource that is common for determination of at least one SINR parameter; and receive the at least one SINR parameter determined based on the common resource.

Certain aspects of the present disclosure can be implemented in a computer-readable medium having instructions stored thereon to cause a UE to: receive, from a BS, a configuration of a single CMR setting and a higher layer parameter indicating that repetition is enabled for the single CMR setting; determine a SINR parameter based on results of performing the channel measurement and the interference measurement based, at least in part, on the higher layer parameter; and transmit the SINR parameter to the BS.

Certain aspects of the present disclosure can be implemented in a computer-readable medium having instructions stored thereon to cause a BS to: transmit, to a UE, a configuration of a single CMR setting and a higher layer parameter indicating that repetition is enabled for the single CMR setting; and receive a SINR parameter based on results of channel measurement and interference measurement performed based, at least in part, on the single CMR setting and the higher layer parameter.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 is a flow diagram illustrating example operations for wireless communication by a BS including SINR determination based on a quasi-co location (QCL) assumption, in accordance with certain aspects of the present disclosure.

FIG. 12 is a flow diagram illustrating example operations for wireless communication by a BS including SINR determination based on non-zero power (NZP) reference signal (RS) resource settings, in accordance with certain aspects of the present disclosure.

FIG. 15 is a flow diagram illustrating example operations for wireless communication by a BS including SINR determination using a common resource, in accordance with certain aspects of the present disclosure.

FIG. 18 is a flow diagram illustrating example operations for wireless communication by a BS including SINR determination using repetition, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
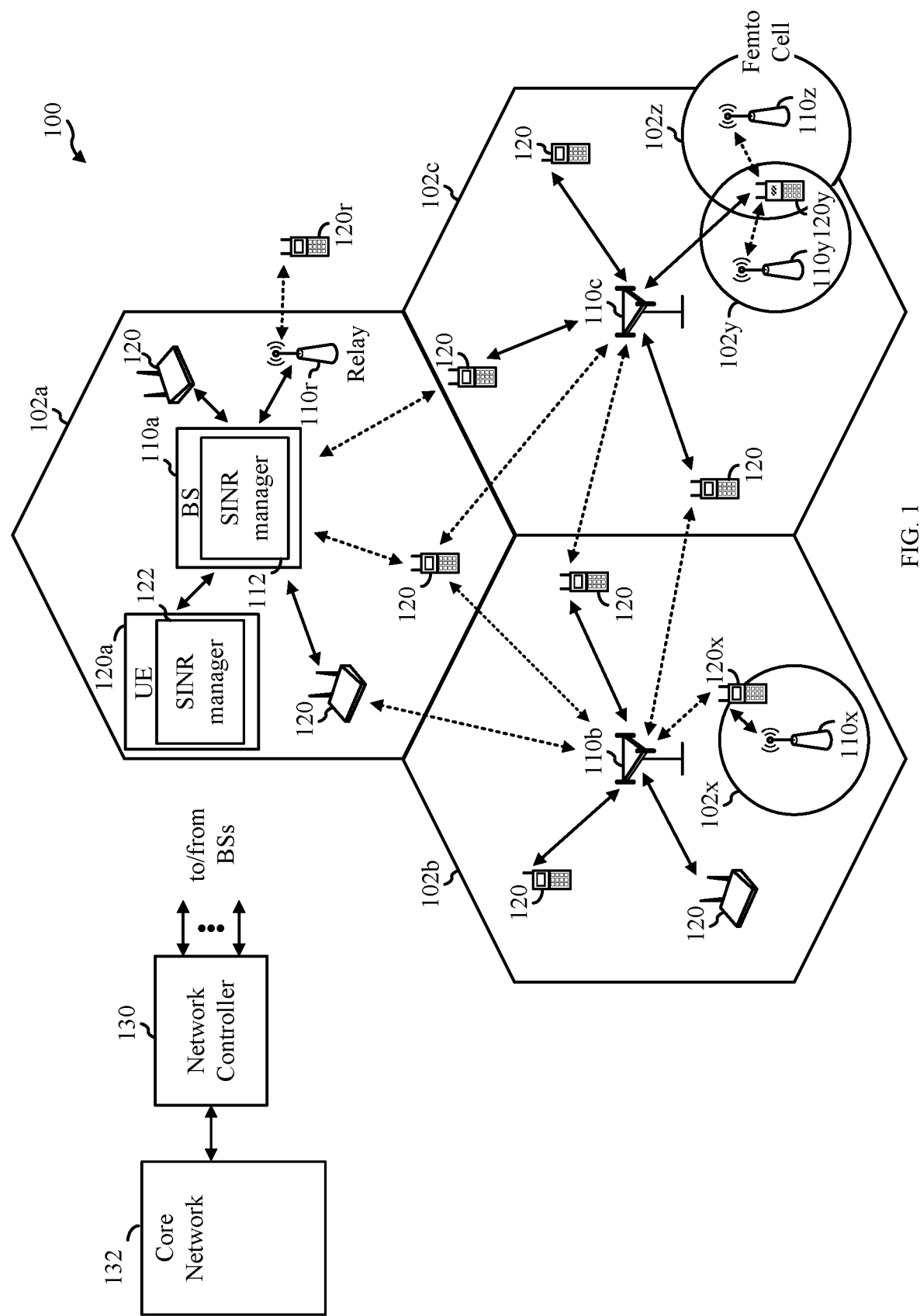
FIG. 1 is a block diagram conceptually illustrating an example telecommunications system, in accordance with certain aspects of the present disclosure.

Aspects of the present disclosure provide apparatus, methods, processing systems, and computer readable mediums for measurement of signal-to-interference-plus-noise ratio (SINR). For example, in certain aspects, a base station (BS) may indicate one or more multiple resource settings to a user-equipment (UE) for the UE to perform channel and interference measurements. In some cases, the BS may indicate a single resource setting, or up to three resource settings, and may indicate that repetition is enabled for the resource setting(s). Certain aspects are directed to determining quasi-co location (QCL). For example, a QCL assumption for a zero-power (ZP) interference measurement resource (IMR) and non-zero power (NZP) IMR may be determined based on a reference signal (RS) configured for channel measurement resource (CMR).

The following description provides examples for SINR determination in communication systems. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces.

As illustrated in FIG. 1, the wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for SINR measurement. As shown in FIG. 1, the BS 110a includes an SINR manager 112. The SINR manager 112 may be configured to provide resource setting(s) for measurement of SINR, in accordance with certain aspects of the present disclosure. As shown in FIG. 1, the UE 120a includes an SINR manager 122. The SINR manager 122 may be configured to receive resource setting (s) and determine SINR based on the resource setting(s), in accordance with certain aspects of the present disclosure.

Figure 2:
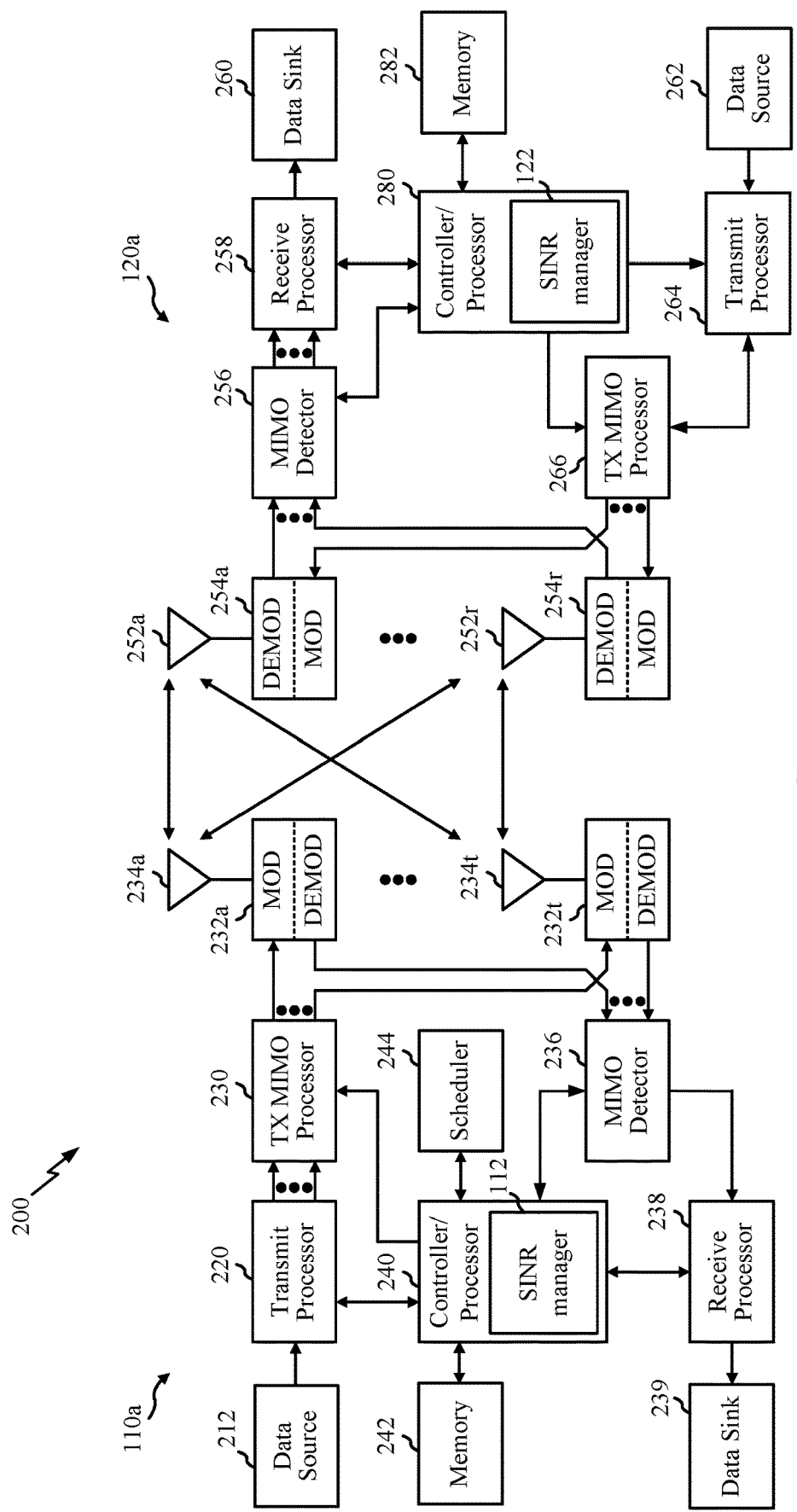
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (RS) (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an SINR manager 112, according to certain aspects described herein. As shown in FIG. 2, the controller/processor 280 of the UE 120a has an SINR manager 122, according to certain aspects described herein. Although shown at the controller/processor, other components of the UE 120a and BS 110a may be used to perform the operations described herein.

NR may utilize OFDM with a cyclic prefix (CP) on the UL and DL. NR may support half-duplex operation using time division duplexing (TDD). OFDM and single-carrier frequency division multiplexing (SC-FDM) may partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Example Techniques for Measurement of
Signal-to-Interference-Plus-Noise-Ratio (SINR)

Aspects of the present disclosure provide techniques for measurement of a layer 1 (L1) signal-to-interference-plus-noise-ratio (SINR). SINR provides an indication of the power of a channel divided by the sum of interference power (from all the other interfering signals) and the power of background noise. For example, channel measurement resource settings may be provided to a user equipment (UE), by a base station (BS), indicating channel measurement resource(s) (CMR) (e.g., channel state information (CSI)-reference signal (RS) CMR). The UE may then perform non-zero power (NZP) channel measurement (CM) using the CMR, the results of the CM to be used in a numerator of the SINR. In some cases, the CMR may also be used for performing interference measurement (IM) to be used in a denominator of the SINR. The IM may include a sum of an NZP IM and a zero power (ZP) IM. In other cases, a resource setting may be provided indicating CSI-RS resource(s) for NZP IM and a resource setting may be provided indicating CSI-RS resource(s) for ZP IM. SINR may be determined (e.g., calculated or computed) using the following equation:

$$\frac{NZP\ CM}{NZP\ IM + ZP\ IM + \text{Noise}}$$

In certain implementations, for L1-SINR, higher layer parameter (also referred to as "repetition") may be configured for NZP CSI-RS only in the case of two resource settings for CMR and interference measurement resource (IMR), respectively. The higher layer parameter "repetition" may be a radio resource control (RRC) layer parameter that is transmitted to the UE using an RRC message. The higher layer parameter "repetition" may indicate whether repetition is enabled for a specific resource setting. In other words, if repetition is enabled for a resource setting, the resource set indicated by the resource setting may be repeated. In certain aspects, the higher layer parameter "repetition" may be configured for an NZP CSI-RS resource set in case of one resource setting, where NZP CSI-RS is used for both channel and interference measurement, as described in more detail herein.

Figure 3:
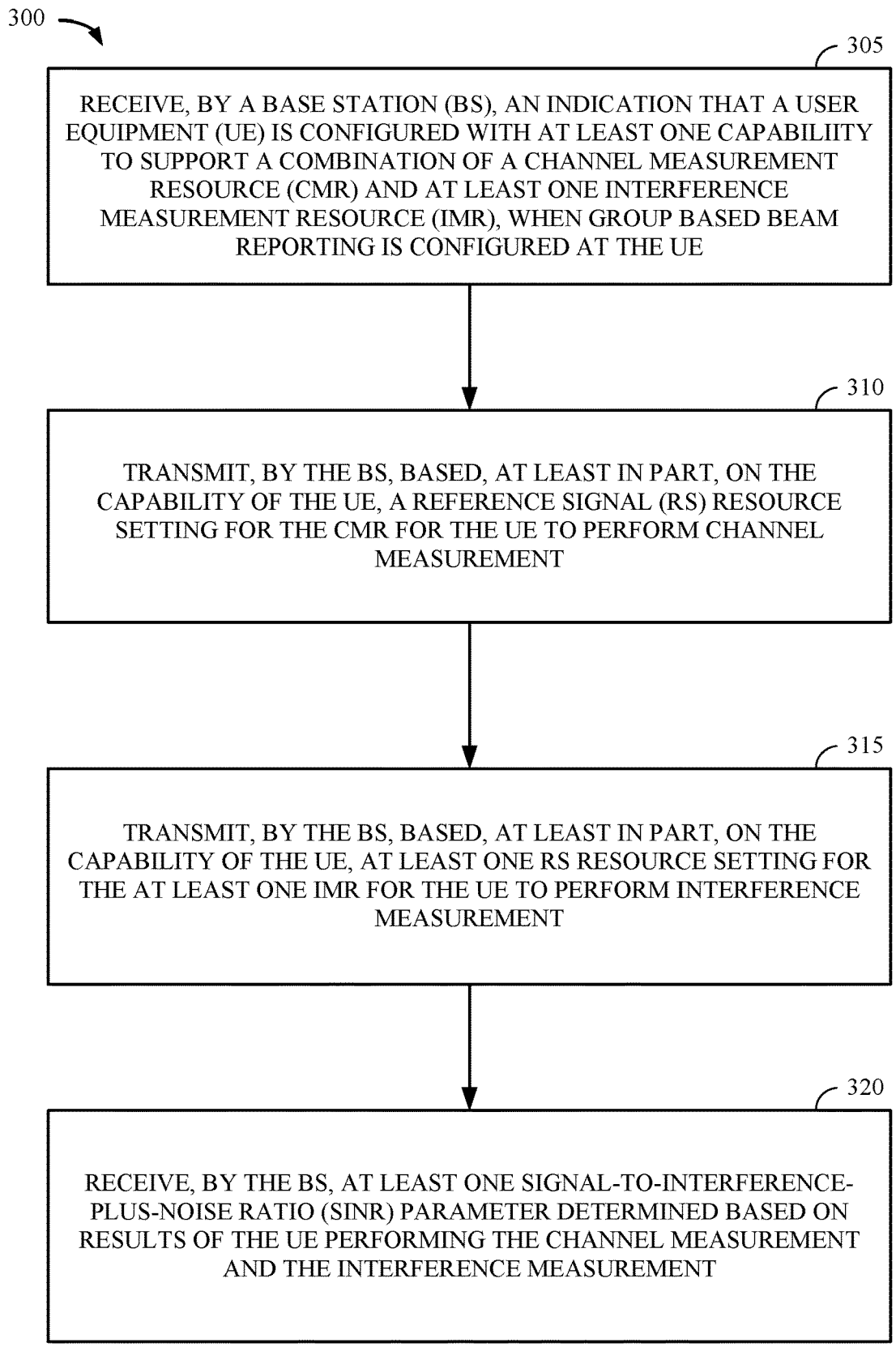
FIG. 3 is a flow diagram illustrating example operations for wireless communication by a BS using group based beam reporting, in accordance with certain aspects of the present disclosure.

FIG. 3 is a flow diagram illustrating example operations for wireless communication by a BS including receiving SINR when group based beam reporting is configured at a UE, in accordance with certain aspects of the present disclosure. The operations 300 may be performed, for example, by BS 110a in the wireless communication network 100.

Operations 300 may be implemented as software components that are executed and run on one or more processors (e.g., controller/processor 240 of FIG. 2). Further, the transmission and reception of signals by the BS in operations 300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 300 may begin, at block 305, with the BS receiving, an indication that a UE is configured with at least one capability to support a combination of a channel CMR and at least one IMR, when group based beam reporting is configured at the UE. At block 310, the BS transmits, based, at least in part, on the capability of the UE, an RS resource setting for the CMR for the UE to perform channel measurement. At block 315, the BS transmits, based, at least in part, on the capability of the UE, at least one RS resource setting for the at least one IMR for the UE to perform interference measurement. At block 320, the BS receives at least one SINR parameter determined based on results of the UE performing channel measurement and the interference measurement.

Figure 4:
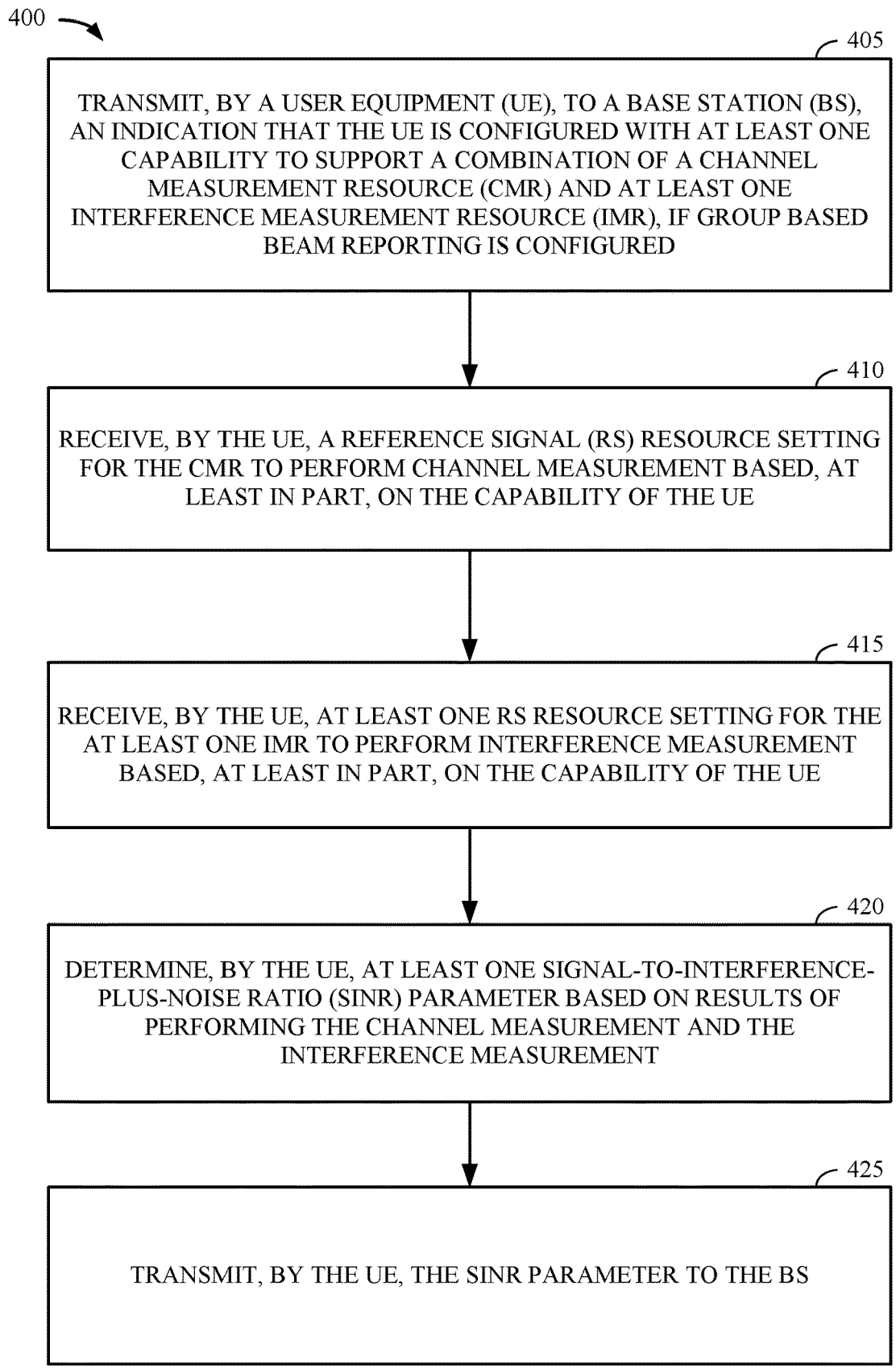
FIG. 4 is a flow diagram illustrating example operations for wireless communication by a UE using group based beam reporting, in accordance with certain aspects of the present disclosure.

FIG. 4 is a flow diagram illustrating example operations for wireless communication by a UE including determining SINR when group based beam reporting is configured at the UE, in accordance with certain aspects of the present disclosure. The operations 400 may be performed, for example, by UE 120a in the wireless communication network 100. The operations 400 may be complementary operations by the UE to the operations 300 performed by the BS.

Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, with the UE transmitting, to a BS, an indication that the UE is configured with at least one capability to support a combination of a CMR and at least one IMR, if group based beam reporting is configured. At block 410, the UE receives an RS resource setting for the CMR to perform channel measurement based, at least in part, on the capability of the UE. At block 415, the UE receives at least one RS resource setting for the at least one IMR to perform interference measurement based, at least in part, on the capability of the UE. At block 420, the UE determines at least one SINR parameter based on results of performing the channel measurement and the interference measurement. At block 425, the UE transmits the SINR parameter to the BS.

Figure 5:
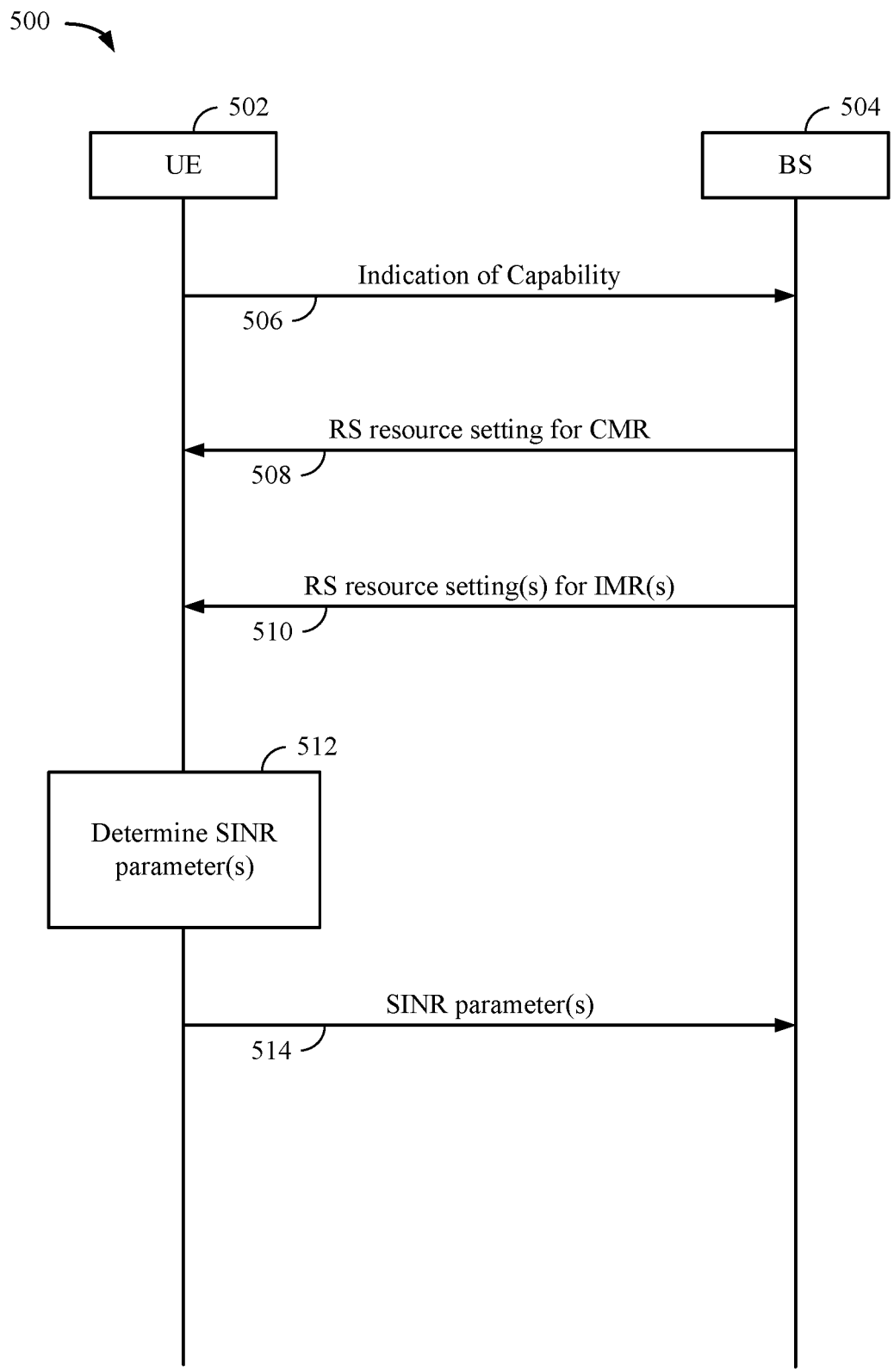
FIG. 5 is a call flow diagram illustrating example operations using group based beam reporting, in accordance with certain aspects of the present disclosure.

Operations 300 and 400 of FIGS. 3 and 4, respectively, may be understood with reference to the call flow diagram of FIG. 5.

FIG. 5 is a call flow diagram illustrating example operations 500 for determining SINR when group based beam reporting is configured at a UE, in accordance with certain aspects of the present disclosure. As illustrated, a UE 502 (e.g., such as UE 120a in the wireless communication network 100) may transmit an indication 506 that the UE is configured with at least one capability to support a combination of a CMR and at least one IMR, if group based beam reporting is configured at UE 502. Based, at least in part, on the capability of the UE 502, a BS 504 (e.g., such as BS 110a in the wireless communication network 100) may transmit an RS resource setting 508 for the CMR for the UE 502 to perform channel measurement. Additionally, based, at least in part, on the capability of the UE 502, the BS 504 (e.g., such as BS 110a in the wireless communication network 100) may transmit RS resource setting(s) 510 for the IMR(s) for the UE 502 to perform interference measurement. Following receipt of the RS resource setting, at block 512, the UE 502 may determine SINR parameter(s) based on results of performing the channel measurement and the interference measurement. The UE 502 may transmit determined SINR parameter(s) 514 to the BS 504.

In some cases, L1-SINR based group beam report may be configured for a UE to report L1-SINR for each of two beams that can be simultaneously received. However, the UE may only support a subset of CMR/IMR combinations for L1-SINR based group beam report. If the UE is configured with a CSI-ReportConfig with the higher layer parameter reportQuantity set to 'cri-SINR' or 'ssb-Index-SINR', and if the UE is configured with the higher layer parameter groupBasedBeamReporting set to 'disabled', the UE may report, in a single report, nrofReportedRSForSINR (e.g., as higher layer configured) different CSI-RS resource indicator (CRI) or synchronization signal block (SSB) resource indictor (SSBRI) for each report setting.

If the UE is configured with the higher layer parameter groupBasedBeamReporting set to 'enabled', the UE may report in a single reporting instance two different CRI or SSBRI for each report setting, where CSI-RS and/or SSB resources may be received simultaneously by the UE, either with a single spatial domain receive filter, or with multiple simultaneous spatial domain receive filters. In certain aspects of the present disclosure, in case of L1-SINR based group beam report, the UE may indicate capability for supporting any set of the following CMR/IMR combinations: (1) NZP CSI-RS as both CMR and IMR, (2) SSB as CMR and NZP CSI-RS as IMR, (3) SSB as CMR and ZP CSI-RS as IMR, (4) SSB as CMR and NZP CSI-RS as IMR and ZP CSI-RS as IMR, (5) NZP CSI-RS as CMR and NZP CSI-RS as IMR, (6) NZP CSI-RS as CMR and ZP CSI-RS as IMR, (7) NZP CSI-RS as CMR and NZP CSI-RS as IMR and ZP CSI-RS as IMR.

Figure 6:
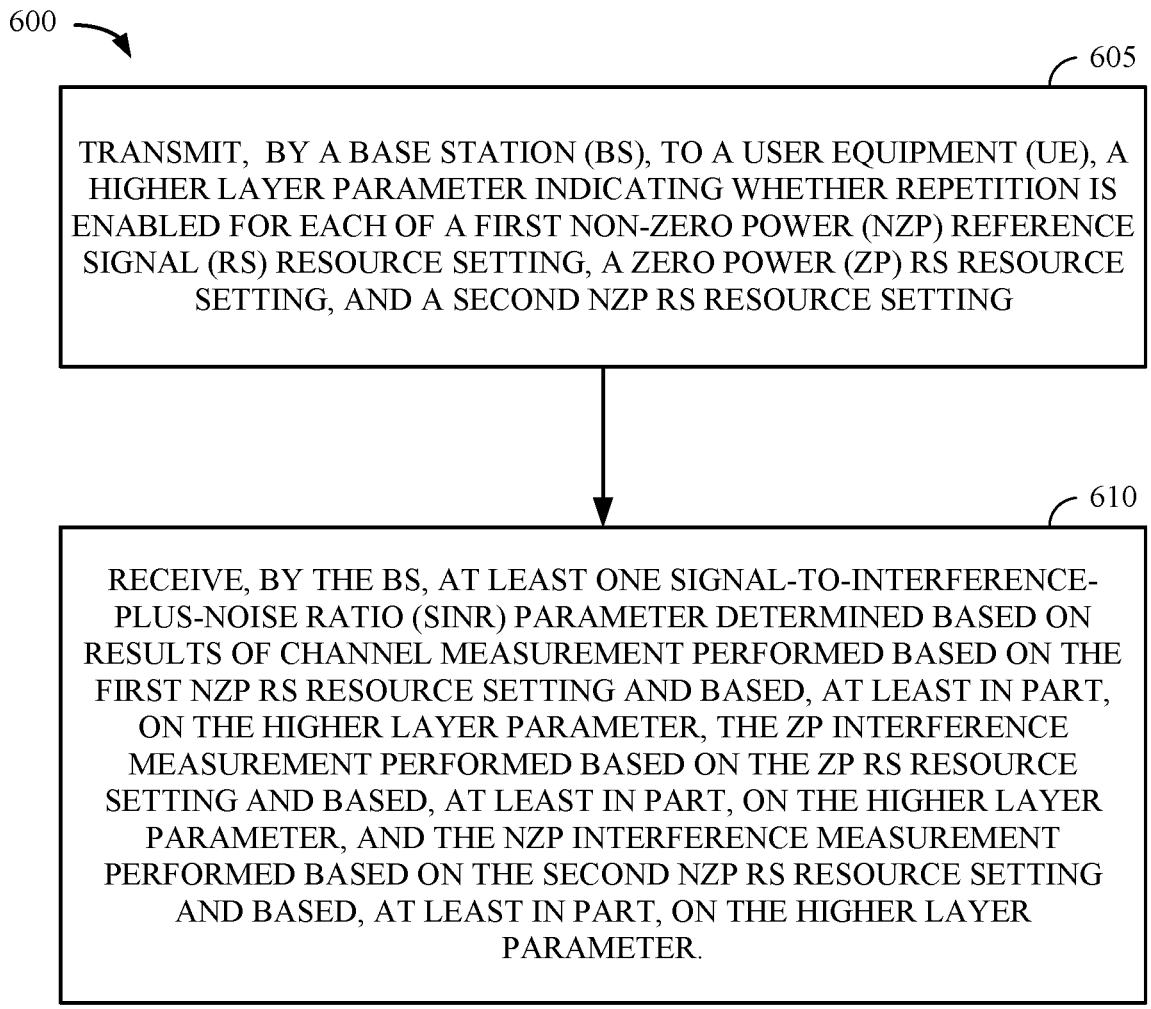
FIG. 6 is a flow diagram illustrating example operations for wireless communication by a BS including signal-to-interference-plus-noise ratio (SINR) determination based on a higher layer parameter, in accordance with certain aspects of the present disclosure.

FIG. 6 is a flow diagram illustrating example operations 600 for wireless communication by a BS, in accordance with certain aspects of the present disclosure. The operations 600 may be performed, for example, by BS 110a in the wireless communication network 100.

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, with the BS transmitting, to a UE, a higher layer parameter indicating whether repetition is enabled for each of a first NZP RS resource setting, a ZP RS resource setting, and a second NZP RS resource setting. At block 610, the BS receives at least one SINR parameter determined based on results of channel measurement performed based, at least in part, on the first NZP RS resource setting and the higher layer parameter, ZP interference measurement performed based, at least in part, on the ZP RS resource setting and the higher layer parameter, and NZP interference measurement performed based, at least in part, on the second NZP RS resource setting and the higher layer parameter.

Figure 7:
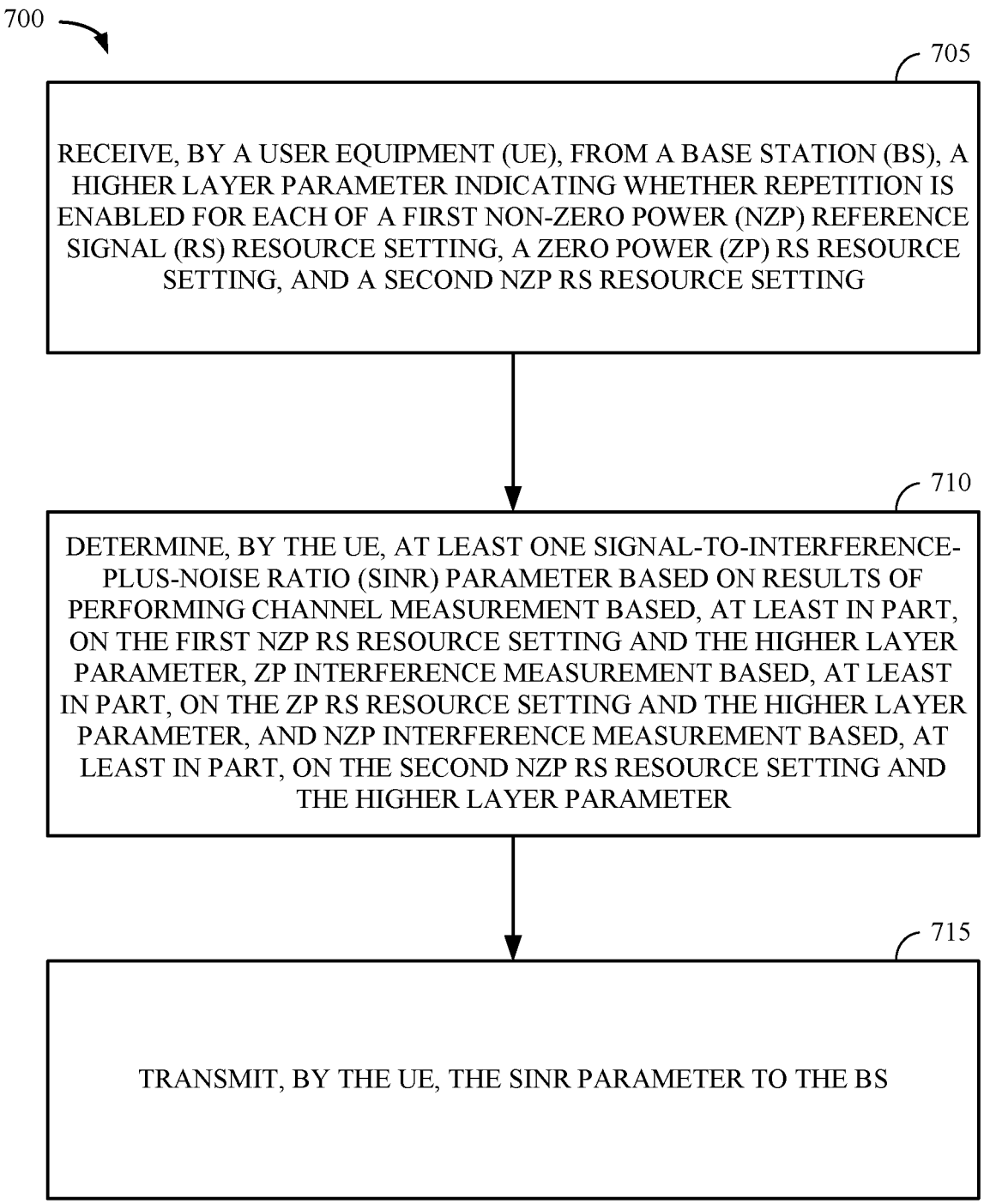
FIG. 7 is a flow diagram illustrating example operations for wireless communication by a UE including SINR determination based on a higher layer parameter, in accordance with certain aspects of the present disclosure.

FIG. 7 is a flow diagram illustrating example operations 700 for wireless communication by a UE, in accordance with certain aspects of the present disclosure. The operations 700 may be performed, for example, by UE 120a in the wireless communication network 100. The operations 700 may be complementary operations by the UE to the operations 600 performed by the BS.

Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, with the UE receiving, from a BS, a higher layer parameter indicating whether repetition is enabled for each of a first NZP RS resource setting, a ZP RS resource setting, and a second NZP RS resource setting. At block 710, the UE determines at least one SINR parameter based on results of performing channel measurement based, at least in part, on the first NZP RS resource setting and the higher layer parameter, ZP interference measurement based, at least in part, on the ZP RS resource setting and the higher layer parameter, and NZP interference measurement based, at least in part, on the second NZP RS resource setting and the higher layer parameter. At block 715, the UE transmits the SINR parameter to the BS.

Figure 8:
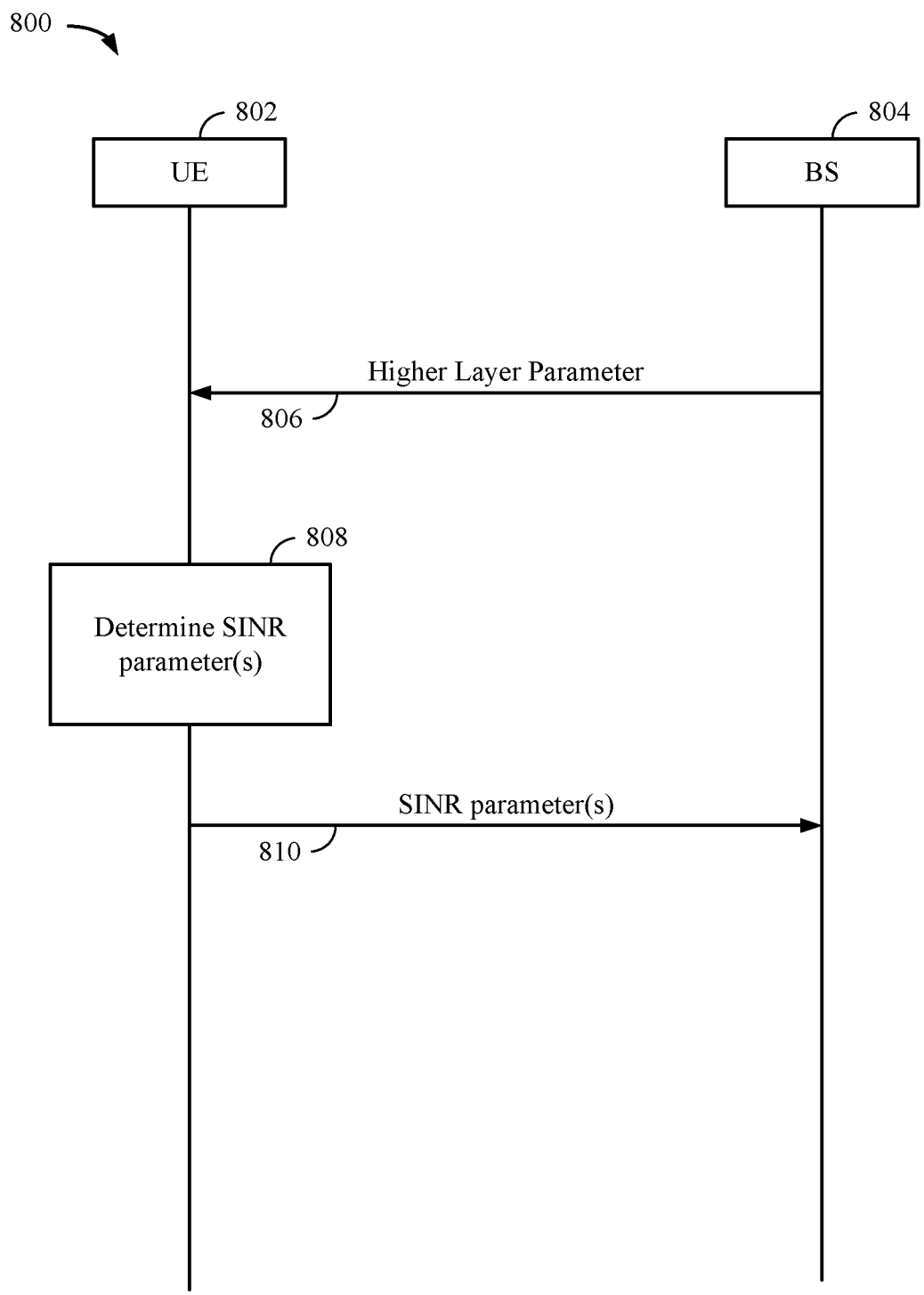
FIG. 8 is a call flow diagram illustrating example operations for SINR determination based on a higher layer parameter, in accordance with certain aspects of the present disclosure.

Operations 600 and 700 of FIGS. 6 and 7, respectively, may be understood with reference to the call flow diagram of FIG. 8.

FIG. 8 is a call flow diagram illustrating example operations 800 for determining SINR based, at least in part, on a higher layer parameter indicating whether repetition is enabled for a specific resource setting, in accordance with certain aspects of the present disclosure. As illustrated, a BS 804 (e.g., such as BS 110a in the wireless communication network 100) may transmit, to a UE 802 (e.g., such as UE 120a in the wireless communication network 100), a higher layer parameter 806 indicating whether repetition is enabled for each of a first NZP RS resource setting, a ZP RS resource setting, and a second NZP RS resource setting. Following receipt of the higher layer parameter 806, at block 808, UE 502 may determine SINR parameter(s) based on results of performing channel measurement based on the first NZP RS resource setting and based, at least in part, on the higher layer parameter, ZP interference measurement based on the ZP RS resource setting and based, at least in part, on the higher layer parameter, and NZP interference measurement based on the second NZP RS resource setting and based, at least in part, on the higher layer parameter. The UE 802 may transmit determined SINR parameter(s) 810 to the BS 804.

For example, for L1-SINR measurement, when three resource settings are configured, the first one of the resource settings (e.g., given by higher layer parameter resourcesForChannelMeasurement) may be for channel measurement on SSB or NZP CSI-RS. The second one of the resource settings (e.g., given by either higher layer parameter csi-IM-ResourcesForInterference) may be for interference measurement performed on CSI-IM. Each NZP CSI-RS resource set for channel measurement may be associated with one CSI-IM resource for interference measurement. The third one of the resource settings (e.g., given by higher layer parameter nzp-CSI-RS-ResourcesForinterference) may be for interference measurement performed on 1 port NZP CSI-RS with density 3 resource elements (REs)/resource blocks (RBs). In certain aspects of the present disclosure, the UE may expect that the NZP CSI-RS resource set for channel measurement, the ZP CSI-RS resource set for interference measurement on CSI-IM, and the NZP-CSI-RS resource set for interference measurement on NZP CSI-RS, if any, may be configured with the higher layer parameter repetition.

In certain aspects of the present disclosure, in case of three resource settings, the NZP CSI-RS resource set may be configured in the resource setting for CMR and/or NZP IMR, and the ZP CSI-RS resource set may be configured in the resource setting for ZP IMR. In certain aspects, the UE applies the SSB or "Quasi Co-Location (QCL)-TypeD" RS configured to an NZP CSI-RS resource for CMR as the RS for determining "QCL-TypeD" assumption for the associated ZP CSI-RS resource for ZP IMR and the associated NZP CSI-RS resource for NZP IMR, as described in more detail herein.

FIG. 9 is a flow diagram illustrating example operations 900 for wireless communication by a BS including receiving SINR determined based, at least in part, on a QCL assumption, in accordance with certain aspects of the present disclosure. The operations 900 may be performed, for example, by BS 110a in the wireless communication network 100.

Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at block 905, with the BS transmitting, to a UE, a first NZP RS resource setting indicating at least one CMR, a ZP RS resource setting indicating at least one IMR, and a second NZP RS resource setting indicating at least one NZP IMR, where a QCL assumption for the at least one ZP IMR and the at least one NZP IMR is determined based on an RS configured for the at least one CMR. At block 910, the BS receives at least one SINR parameter based on results of channel measurement performed based on the at least one CMR, ZP interference measurement performed based, at least in part, on the at least one ZP IMR and based, at least in part, on the QCL assumption, and NZP interference measurement performed based, at least in part, on the at least one NZP IMR and the QCL assumption.

Figure 10:
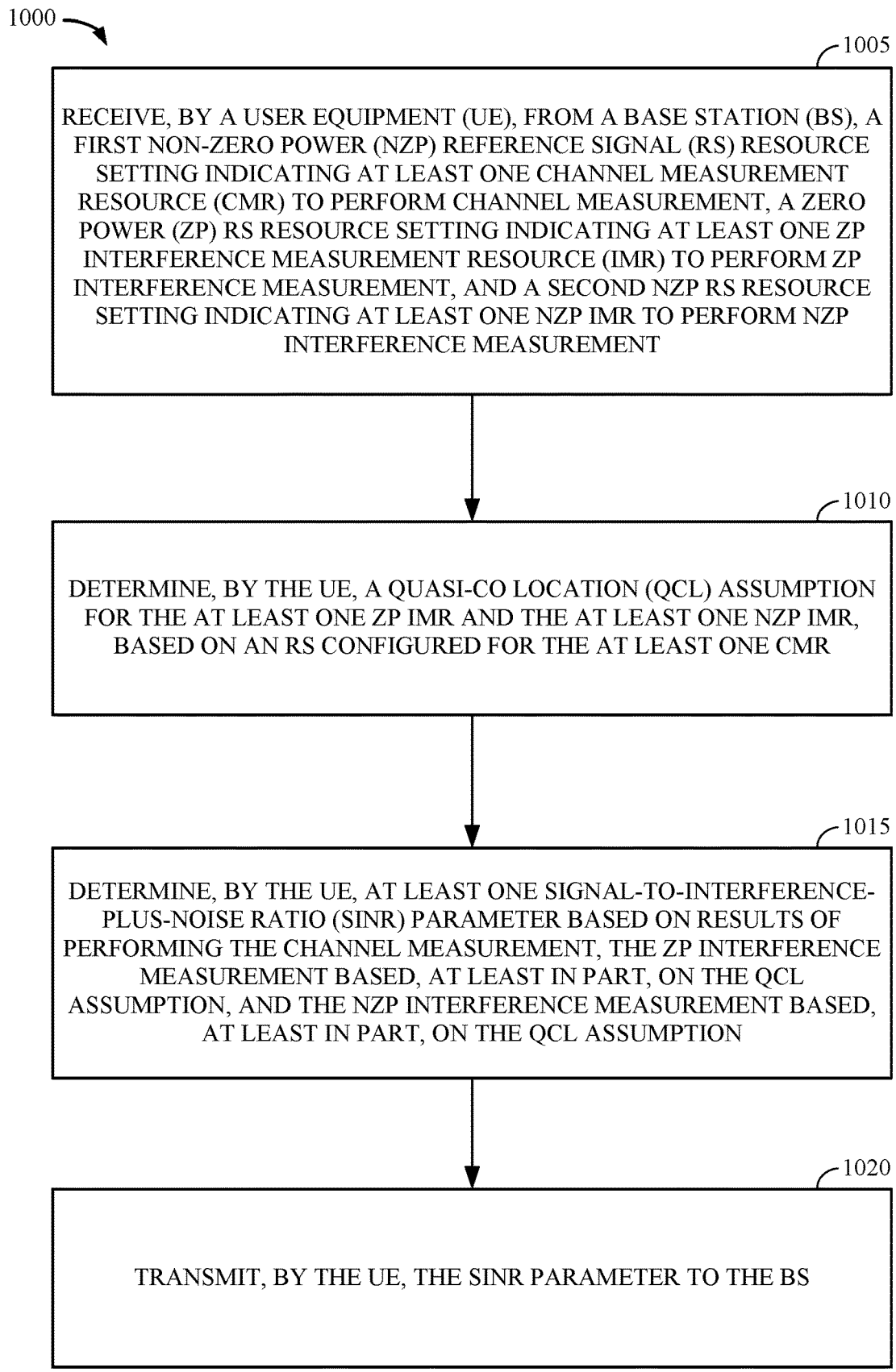
FIG. 10 is a flow diagram illustrating example operations for wireless communication by a UE including SINR determination based on a QCL assumption, in accordance with certain aspects of the present disclosure.

FIG. 10 is a flow diagram illustrating example operations 1000 for wireless communication by a UE including determining SINR based, at least in part, on a QCL assumption, in accordance with certain aspects of the present disclosure. The operations 1000 may be performed, for example, by UE 120a in the wireless communication network 100. The operations 1000 may be complementary operations by the UE to the operations 900 performed by the BS.

Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1005, with the UE receiving, from a BS, a first NZP RS resource setting indicating at least one CMR to perform channel measurement, a ZP RS resource setting indicating at least one ZP IMR to perform ZP interference measurement, and a second NZP RS resource setting indicating at least one NZP IMR to perform NZP interference measurement. At block 1010, the UE determines a QCL assumption for the at least one ZP IMR and the at least one NZP IMR, based on an RS configured for the at least one CMR. At block 1015, the UE determines at least one SINR parameter based on results of performing the channel measurement, the ZP interference measurement based, at least in part, on the QCL assumption, and the NZP interference measurement based, at least in part, on the QCL assumption. At block 1020, the UE transmits the SINR parameter to the BS.

Figure 11:
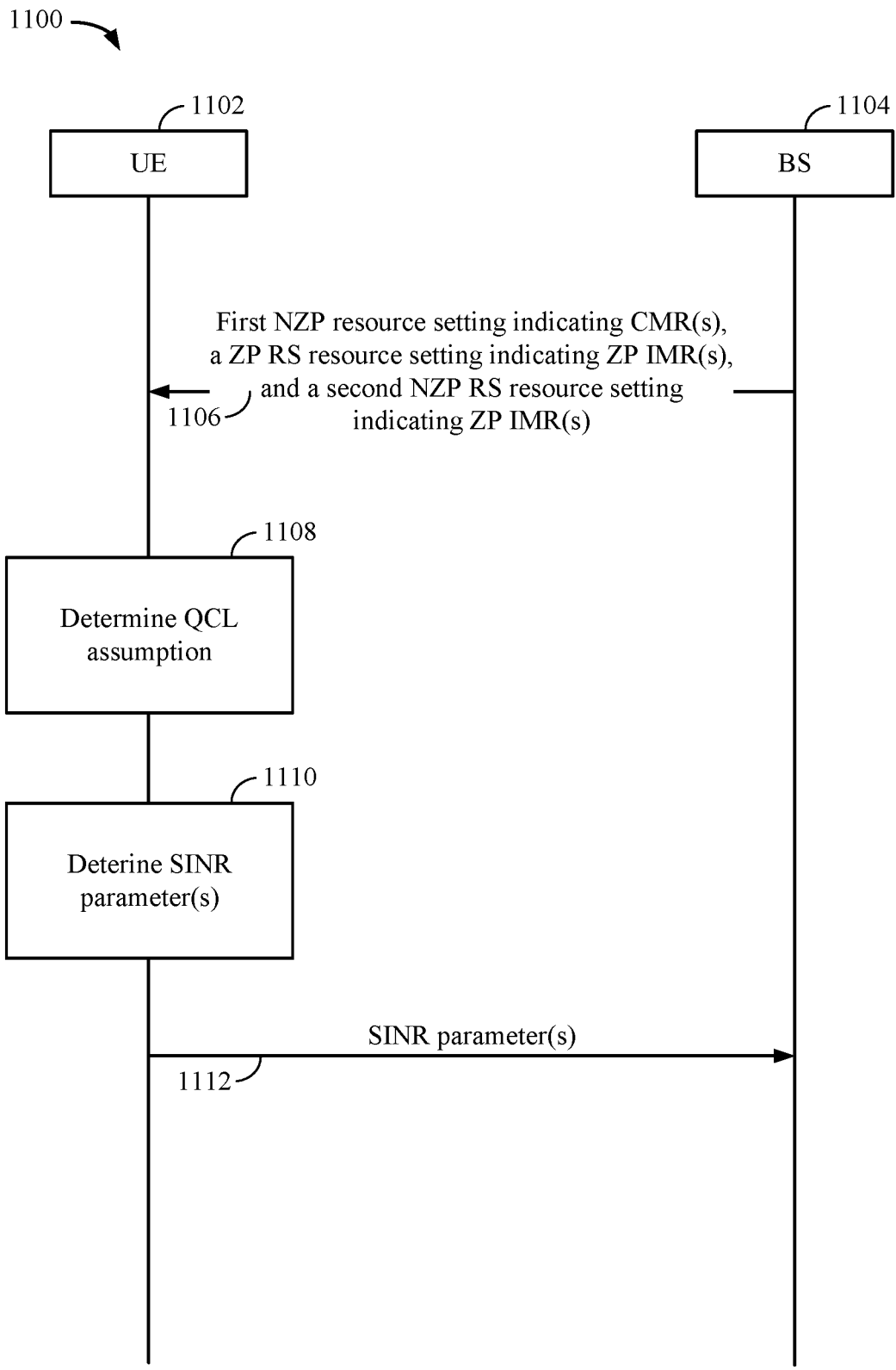
FIG. 11 is a call flow diagram illustrating example operations for SINR determination based on a QCL assumption, in accordance with certain aspects of the present disclosure.

Operations 900 and 1000 of FIGS. 9 and 10, respectively, may be understood with reference to the call flow diagram of FIG. 11.

FIG. 11 is a call flow diagram illustrating example operations 1100 for determining SINR based, at least in part, on a QCL assumption, in accordance with certain aspects of the present disclosure. As illustrated, a BS 1104 (e.g., such as BS 110a in the wireless communication network 100) may transmit, to a UE 1102 (e.g., such as UE 120a in the wireless communication network 100), resource settings 1106 including a first NZP RS resource setting indicating at least one CMR to perform channel measurement, a ZP RS resource setting indicating at least one ZP IMR to perform ZP interference measurement, and a second NZP RS resource setting indicating at least one NZP IMR to perform NZP interference measurement. Following receipt of the resource settings 1106, at block 1108, UE 1102 may determine a QCL assumption for the at least one ZP IMR and the at least one NZP IMR, based on an RS configured for the at least one CMR. At block 1110, UE 1102 may determine SINR parameter(s) based on results of performing the channel measurement, the ZP interference measurement based, at least in part, on the QCL assumption, and the NZP interference measurement based, at least in part, on the QCL assumption. The UE 802 may transmit determined SINR parameter(s) 1112 to the BS 1104.

For example, for L1-SINR measurement, when three resource settings are configured, the first one of the resource settings (e.g., given by higher layer parameter resourcesForChannelMeasurement) is for channel measurement on SSB or NZP CSI-RS. The second one of the resource settings (e.g., given by either higher layer parameter csi-IM-ResourcesForinterference) is for interference measurement performed on CSI-IM, where each NZP CSI-RS resource set for channel measurement is associated with one CSI-IM resource for interference measurement. The third one of the resource settings (e.g., given by higher layer parameter nzp-CSI-RS-ResourcesForinterference) is for interference measurement performed on 1 port NZP CSI-RS with density 3 REs/RB. In certain aspects of the present disclosure, the UE may apply the SSB or 'QCL-TypeD' RS configured for the NZP CSI-RS resource for channel measurement as the reference RS for determining 'QCL-TypeD' assumption for the corresponding CSI-IM resource and the corresponding NZP CSI-RS resource for interference measurement configured for one CSI reporting.

FIG. 12 is a flow diagram illustrating example operations 1200 for wireless communication by a BS including receiving SINR determined based, at least in part, on first and second NZP RS resource settings indicating the same number of resources, in accordance with certain aspects of the present disclosure. The operations 1200 may be performed, for example, by BS 110a in the wireless communication network 100.

Operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 may begin, at block 1205, with the BS transmitting, to a UE, a first NZP RS resource setting indicating at least one CMR, a ZP RS resource setting indicating at least one ZP IMR, and a second NZP RS resource setting indicating at least one NZP IMR, the first NZP RS resource setting indicating the same number of resources as the second NZP RS resource setting. At block 1210, the BS receives at least one SINR parameter based on results of channel measurement performed based on the at least one CMR, ZP interference measurement performed based on the at least one ZP IMR, and NZP interference measurement performed based on the at least one NZP IMR.

Figure 13:
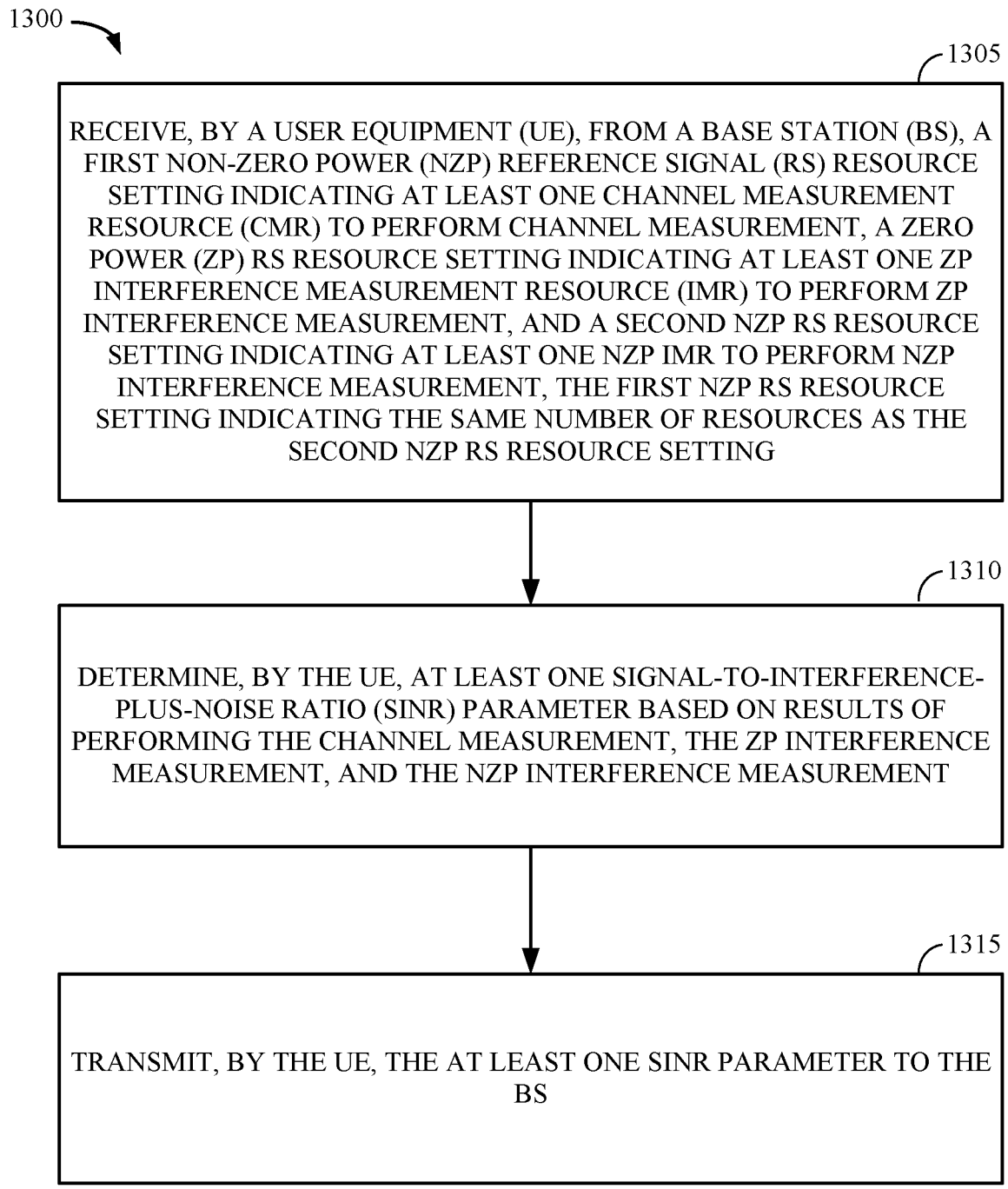
FIG. 13 is a flow diagram illustrating example operations for wireless communication by a UE SINR determination based on NZP RS resource settings, in accordance with certain aspects of the present disclosure.

FIG. 13 is a flow diagram illustrating example operations 1300 for wireless communication by a UE including determining SINR based, at least in part, on first and second NZP RS resource settings indicating a same number of resources, in accordance with certain aspects of the present disclosure. The operations 1300 may be performed, for example, by UE 120a in the wireless communication network 100. The operations 1300 may be complementary operations by the UE to the operations 1200 performed by the BS.

Operations 1300 may be implemented as software components that are executed and run on one or more processors (e.g., controller/processor 280 of FIG. 2). Further, the transmission and reception of signals by the UE in operations 1300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1300 may begin, at block 1305, with the UE receiving, from a BS, a first NZP RS resource setting indicating at least one CMR to perform channel measurement, a ZP RS resource setting indicating at least one ZP IMR to perform ZP interference measurement, and a second NZP RS resource setting indicating at least one NZP IMR to perform NZP interference measurement, the first NZP RS resource setting indicating the same number of resources as the second NZP RS resource setting. At block 1310, the UE determines at least one SINR parameter based on results of performing the channel measurement, the ZP interference measurement, and the NZP interference measurement, and at block 1315, the UE transmits the at least one SINR parameter to the BS.

Figure 14:
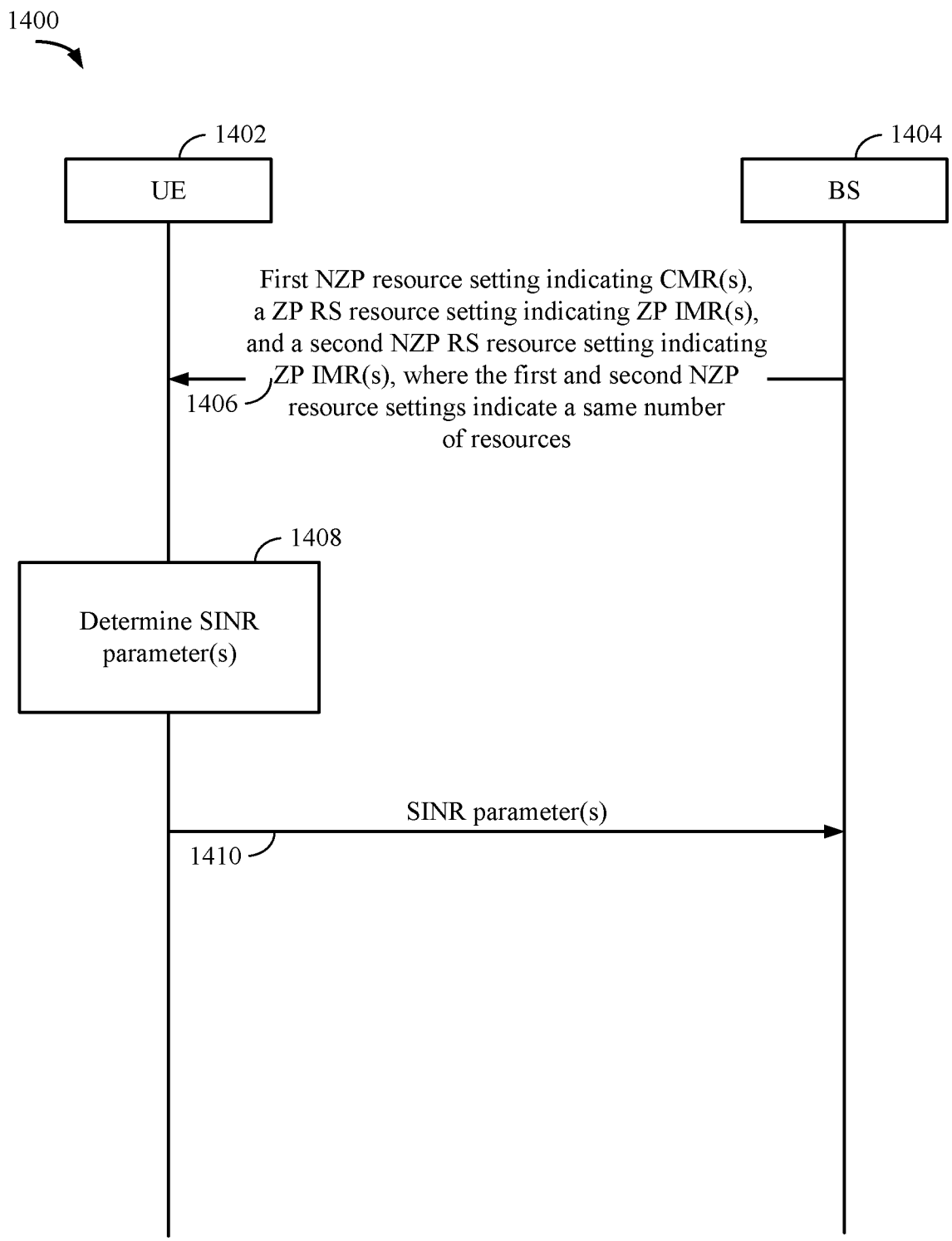
FIG. 14 is a call flow diagram illustrating example operations for SINR determination based on NZP RS resource settings, in accordance with certain aspects of the present disclosure.

Operations 1200 and 1300 of FIGS. 12 and 13, respectively, may be understood with reference to the call flow diagram of FIG. 14.

FIG. 14 is a call flow diagram illustrating example operations 1400 for determining SINR based, at least in part, on first and second NZP RS resource settings indicating a same number of resources, in accordance with certain aspects of the present disclosure. As illustrated, a BS 1404 (e.g., such as BS 110a in the wireless communication network 100) may transmit, to a UE 1402 (e.g., such as UE 120a in the wireless communication network 100), resource settings 1406 including a first NZP RS resource setting indicating at least one CMR to perform channel measurement, a ZP RS resource setting indicating at least one ZP IMR to perform ZP interference measurement, and a second NZP RS resource setting indicating at least one NZP IMR to perform NZP interference measurement, the first NZP RS resource setting indicating the same number of resources as the second NZP RS resource setting. Following receipt of the resource settings 1406, at block 1408, UE 1402 may determine SINR parameter(s) based on results of performing the channel measurement, the ZP interference measurement, and the NZP interference measurement. The UE 1402 may transmit determined SINR parameter(s) 1410 to the BS 1404.

For example, in case of three resource settings for CMR, ZP IMR, and NZP IMR, respectively, to compute each L1-SINR value, the mapping of corresponding resources in CMR, ZP IMR, and NZP IMR may be M resource(s) for CMR, M resource(s) for NZP IMR, and M resource(s) for ZP IMR, M being an integer equal to or greater than 1. Each L1-SINR may be computed based on 1 CMR resource based on the ordering in the resource set for CMR, 1 NZP IMR based on the ordering in the resource set for NZP IMR, and 1 ZP IMR based on the ordering in the resource set for ZP IMR. For example, for each of the M resource(s) i, SINR may be determined (e.g., calculated) per the expression:

$$\frac{NZP\ CM_i}{ZP\ IM_i + NZP\ IM_i + \text{noise}}$$

NZP CM, being the NZP CM based on resource i of a first resource setting (e.g., CM resource setting), ZP IM, being the ZP IM based on resource i of a second resource setting (e.g., ZP IM resource setting), and NZP IM, being the NZP IM based on resource i of a third resource setting (e.g., NZP IM resource setting). In certain aspects, the SINR may be determined based on a common resource, as described in more detail herein.

FIG. 15 is a flow diagram illustrating example operations 1500 for wireless communication by a BS including receiving SINR determined based, at least in part, on a CMR or a ZP IMR having a common resource, in accordance with certain aspects of the present disclosure. The operations 1500 may be performed, for example, by BS 110a in the wireless communication network 100.

Operations 1500 may be implemented as software components that are executed and run on one or more processors (e.g., controller/processor 240 of FIG. 2). Further, the transmission and reception of signals by the BS in operations 1500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1500 may begin, at block 1505, by the BS transmitting, to a UE, a first NZP RS resource setting indicating at least one CMR, a ZP RS resource setting indicating at least one ZP IMR, and a second NZP RS resource setting indicating multiple NZP IMRs, the CMR or the ZP IMR comprising a common resource that is common for determination of at least one SINR parameter. At block 1510, the BS receives the at least one SINR parameter determined based on the common resource.

Figure 16:
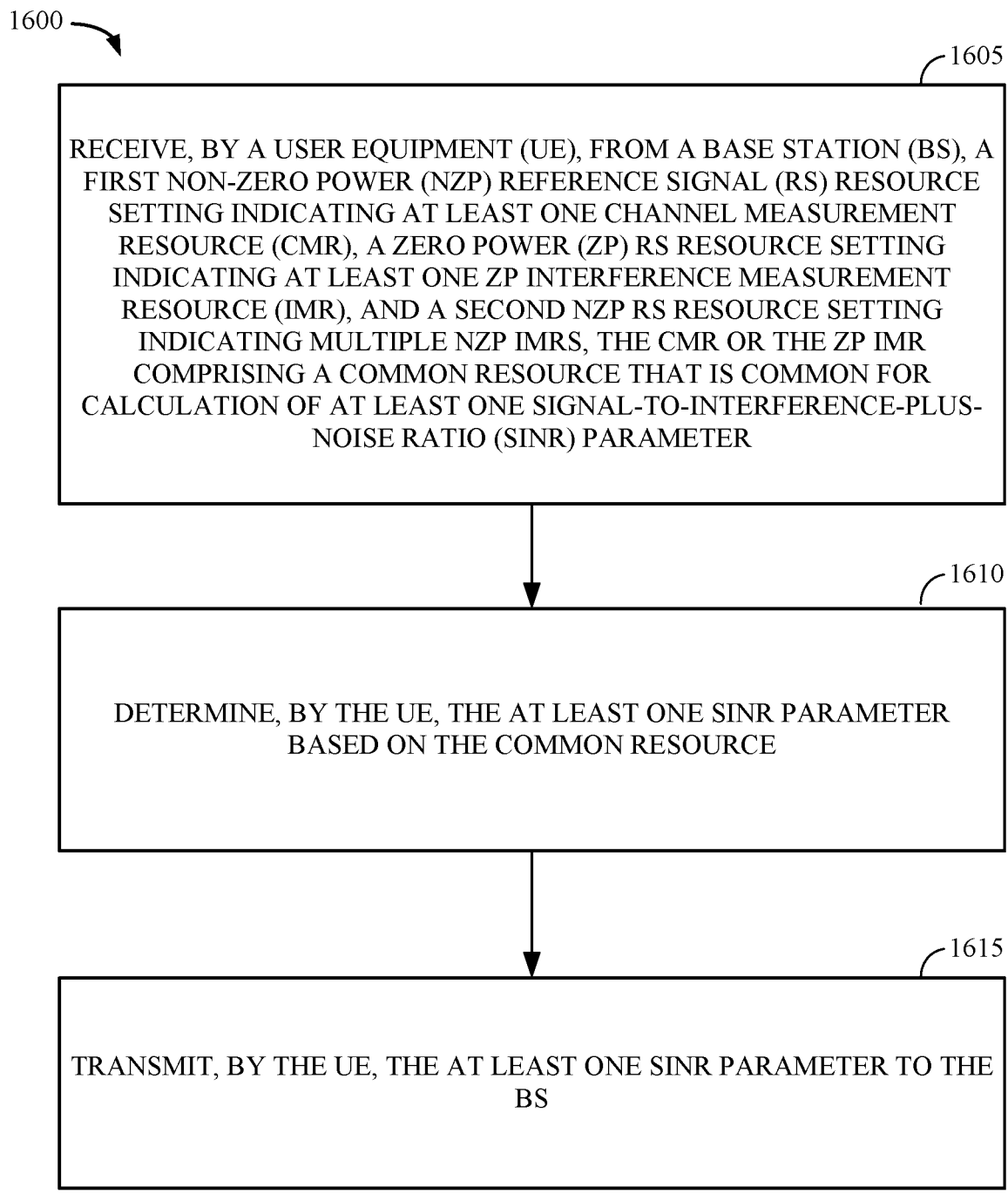
FIG. 16 is a flow diagram illustrating example operations for wireless communication by a UE SINR determination using a common resource, in accordance with certain aspects of the present disclosure.

FIG. 16 is a flow diagram illustrating example operations 1600 for wireless communication by a UE including determining SINR based, at least in part, on a CMR or a ZP IMR having a common resource, in accordance with certain aspects of the present disclosure. The operations 1600 may be performed, for example, by UE 120a in the wireless communication network 100. The operations 1600 may be complementary operations by the UE to the operations 1500 performed by the BS.

Operations 1600 may be implemented as software components that are executed and run on one or more processors (e.g., controller/processor 280 of FIG. 2). Further, the transmission and reception of signals by the UE in operations 1600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1600 may begin, at block 1605, with the UE receiving, from a BS, a first NZP RS resource setting indicating at least one CMR, a ZP RS resource setting indicating at least one ZP IMR, and a second NZP RS resource setting indicating multiple NZP IMRs, the CMR or the ZP IMR comprising a common resource that is common for determination of at least one SINR parameter. At block 1610, the UE determines the at least one SINR parameter based on the common resource, and at block 1615, the UE transmits the at least one SINR parameter to the BS.

Figure 17:
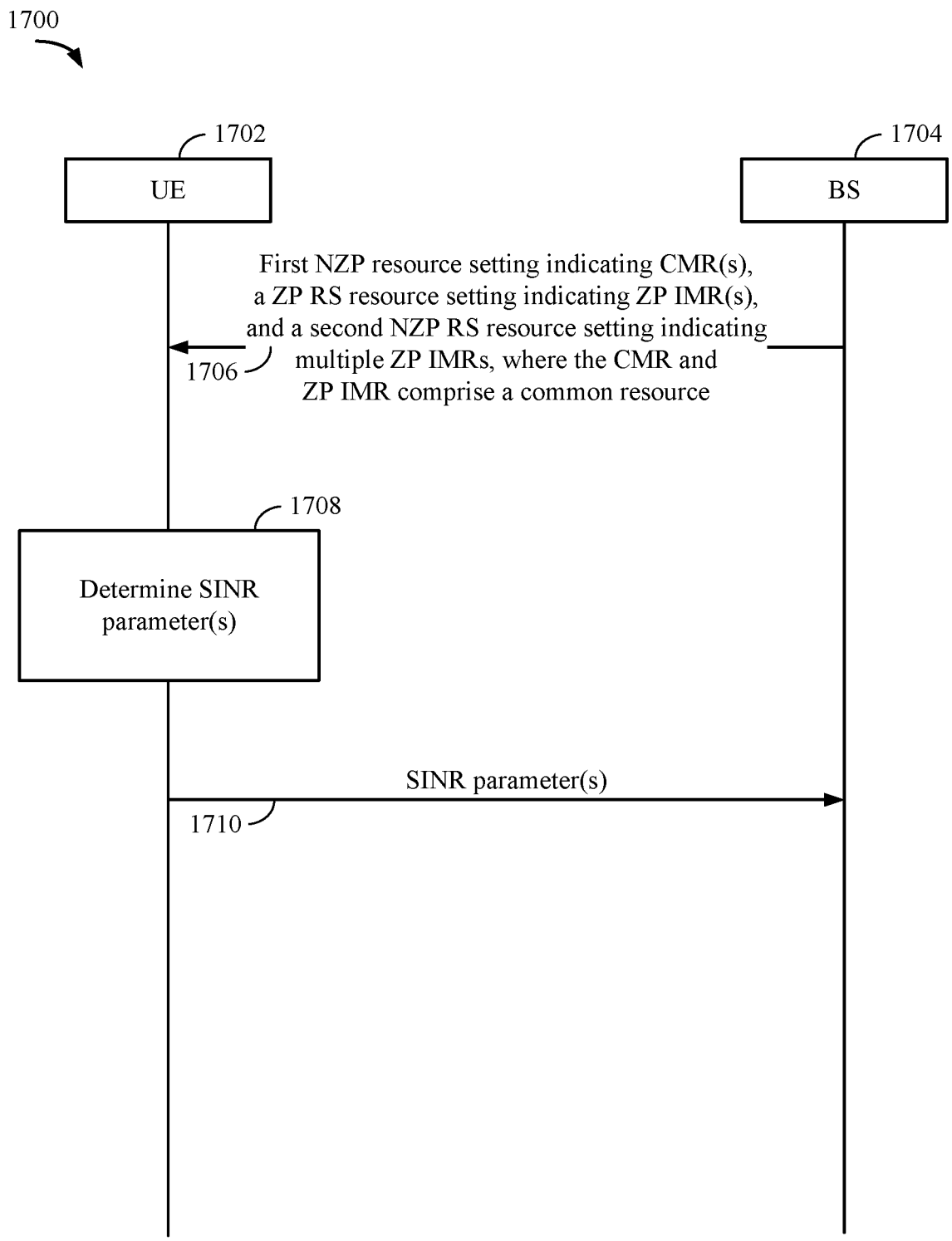
FIG. 17 is a call flow diagram illustrating example operations for SINR determination using a common resource, in accordance with certain aspects of the present disclosure.

Operations 1500 and 1600 of FIGS. 15 and 16, respectively, may be understood with reference to the call flow diagram of FIG. 17.

FIG. 17 is a call flow diagram illustrating example operations 1700 for determining SINR based, at least in part, on a CMR or a ZP IMR having a common resource, in accordance with certain aspects of the present disclosure. As illustrated, a BS 1704 (e.g., such as BS 110a in the wireless communication network 100) may transmit, to a UE 1702 (e.g., such as UE 120a in the wireless communication network 100), resource settings 1706 including a first NZP RS resource setting indicating at least one CMR, a ZP RS resource setting indicating at least one ZP IMR, and a second NZP RS resource setting indicating multiple NZP IMRs, the CMR or the ZP IMR comprising a common resource that is common for determination of at least one SINR parameter. Following receipt of the resource settings 1706, at block 1708, UE 1702 may determine SINR parameter(s) based on the common resource. The UE 1702 may transmit determined SINR parameter(s) 1710 to the BS 1704. As used herein, a common resource may be a resource that is used for the determination of SINR for multiple resources M, M being an integer equal to or greater than 1.

For example, in case of three resource settings for CMR, ZP IMR, and NZP IMR, respectively, to compute each L1-SINR value, the mapping of corresponding resources in CMR, ZP IMR, and NZP IMR may be M resource(s) for CMR, M resource(s) for NZP IMR, and 1 common resource for ZP IMR. Each L1-SINR may be computed based on 1 CMR resource based on the ordering in the resource set for CMR, 1 NZP IMR based on the ordering in the resource set for NZP IMR, and 1 common ZP IMR resource. For example, for each of the M resource(s) i, SINR may be determined (e.g., calculated) per the expression:

$$\frac{NZP\ CM_i}{ZP\ IM + NZP\ IM_i + \text{noise}}$$

NZP CM, being the NZP CM based on resource i of a first resource setting (e.g., CM resource setting), ZP IM being the ZP interference measurement based on the common resource of a second resource setting (e.g., ZP IM resource setting), and $NZP\ IM_i$ being the NZP IM for resource i of a third resource setting (e.g., NZP IM resource setting).

In certain aspects, in case of three resource settings for CMR, ZP IMR, and NZP IMR, respectively, to compute each L1-SINR value, the mapping of corresponding resources in CMR, ZP IMR, and NZP IMR may be 1 common resource for CMR, M resource(s) for NZP IMR, and N resource(s) for ZP IMR. N may be an integer equal to or greater than 1, and M may be an integer equal to or greater than 1. In some cases, M may be different than N. A single L1-SINR may be computed based on the 1 common CMR resource, M NZP IMR(s), and NZP IMR(s).

In certain aspects, for L1-SINR, the UE may indicate, to the BS, capability for supporting the configuration with three resource settings for CMR, ZP IMR, and NZP IMR. For example, the UE may indicate the capability for supporting either one or both of the following capabilities in case of three resource settings: (1) SSB as CMR+ZP CSI-RS as ZP IMR+NZP CSI-RS as NZP IMR, and (2) NZP CSI-RS as CMR+ZP CSI-RS as ZP IMR+NZP CSI-RS as NZP IMR. The BS may then configure resource settings based, at least in part, on the indicated capability of the UE.

FIG. 18 is a flow diagram illustrating example operations 1800 for wireless communication by a BS including receiving SINR determined based, at least in part, on a higher layer parameter indicating that repetition is enabled for a single CMR setting, in accordance with certain aspects of the present disclosure. The operations 1800 may be performed, for example, by BS 110*a* in the wireless communication network 100.

Operations 1800 may be implemented as software components that are executed and run on one or more processors (e.g., controller/processor 240 of FIG. 2). Further, the transmission and reception of signals by the BS in operations 1800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1800 may begin, at block 1805, with the BS transmitting, to a UE, a configuration of a single CMR setting and a higher layer parameter indicating that repetition is enabled for the single CMR setting. At block 1810, the BS may receive a SINR parameter based on results of channel measurement and interference measurement performed based, at least in part, on the single CMR setting and the higher layer parameter.

Figure 19:
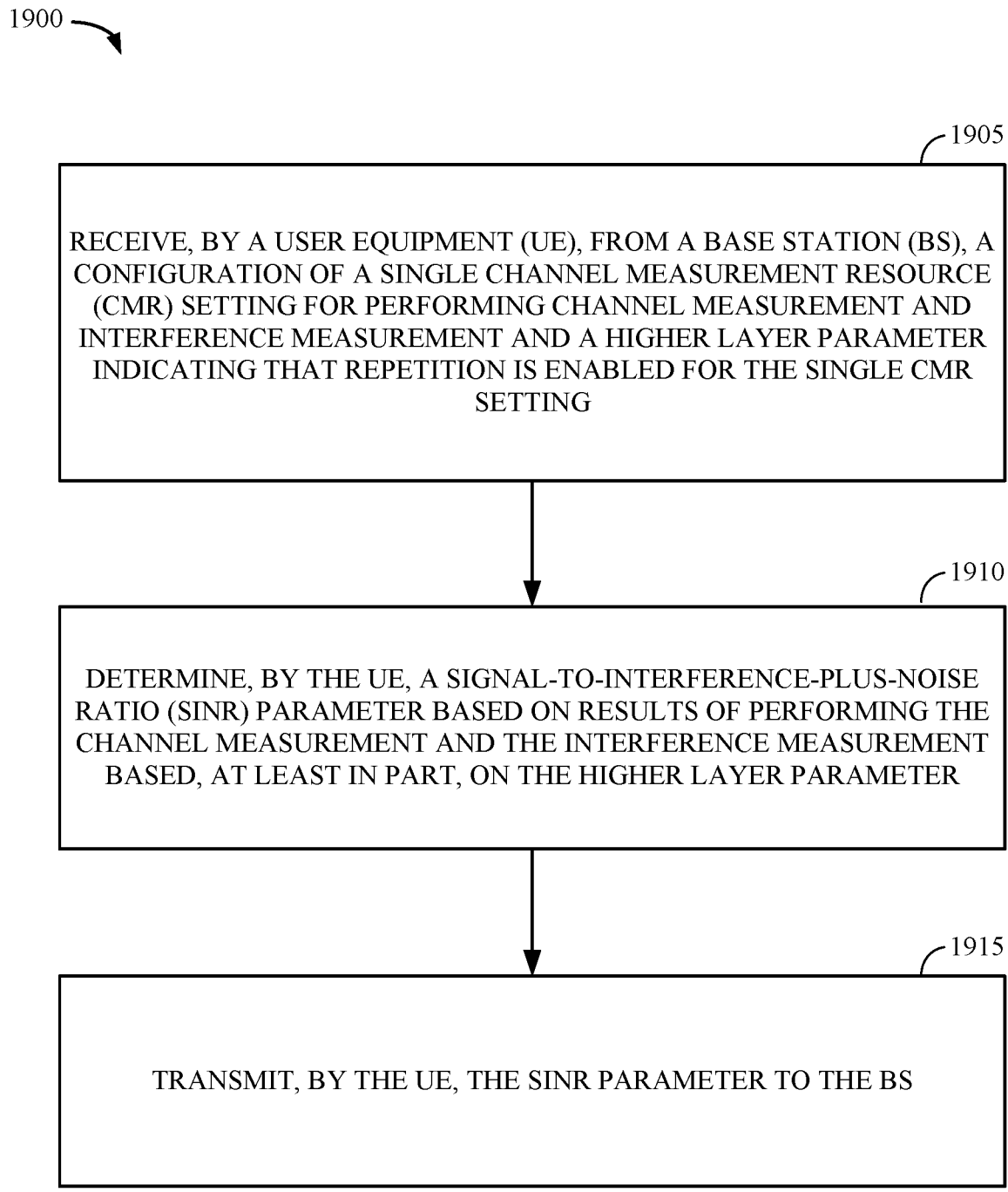
FIG. 19 is a flow diagram illustrating example operations for wireless communication by a UE including SINR determination using repetition, in accordance with certain aspects of the present disclosure.

FIG. 19 is a flow diagram illustrating example operations 1900 for wireless communication by a UE including determining SINR based on a higher layer parameter indicating that repetition is enabled for a single CMR setting, in accordance with certain aspects of the present disclosure. The operations 1900 may be performed, for example, by UE 120*a* in the wireless communication network 100. The operations 1900 may be complementary operations by the UE to the operations 1800 performed by the BS.

Operations 1900 may be implemented as software components that are executed and run on one or more processors (e.g., controller/processor 280 of FIG. 2). Further, the transmission and reception of signals by the UE in operations 1900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1900 may begin, at block 1905, with the UE receiving, from a BS, a configuration of a single CMR setting (e.g., CSI-RS resource setting) for performing channel measurement and interference measurement and a higher layer parameter indicating that repetition is enabled for the single CMR setting. At block 1910, the UE determines a SINR parameter based on results of performing the channel measurement and the interference measurement. At block 1915, the UE transmits the SINR parameter to the BS.

Figure 20:
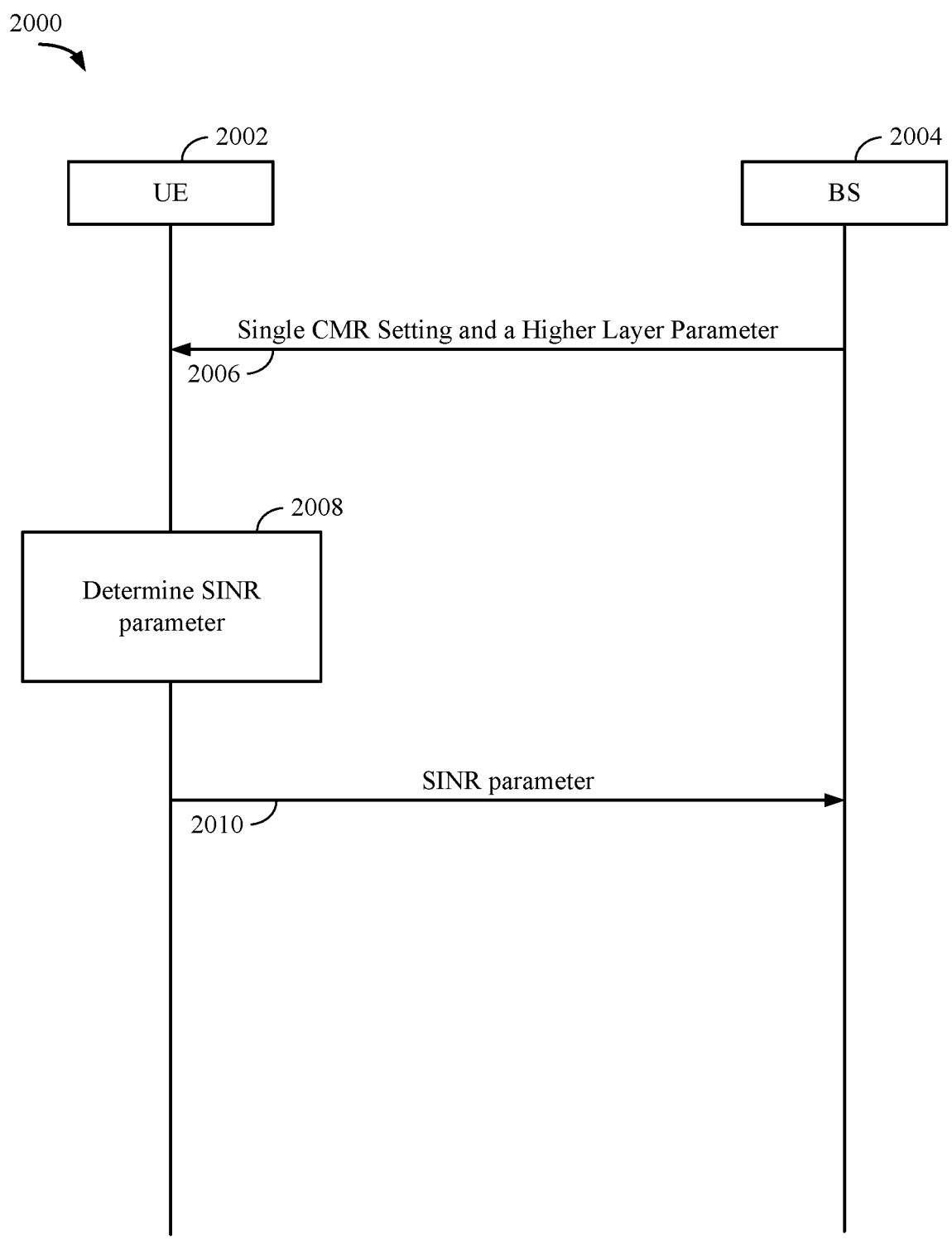
FIG. 20 is a call flow diagram illustrating example operations for SINR determination using repetition, in accordance with certain aspects of the present disclosure.

Operations 1800 and 1900 of FIGS. 18 and 19, respectively, may be understood with reference to the call flow diagram of FIG. 20.

FIG. 20 is a call flow diagram illustrating example operations 2000 for determining SINR based, at least in part, on a higher layer parameter indicating that repetition is enabled for a single CMR setting, in accordance with certain aspects of the present disclosure. As illustrated, a BS 2004 (e.g., such as BS 110*a* in the wireless communication network 100) may transmit, to a UE 2002 (e.g., such as UE 120*a* in the wireless communication network 100), a message 2006 including a configuration of a single CMR setting for performing channel measurement and interference measurement and a higher layer parameter indicating that repetition is enabled for the single CMR setting. Following receipt of the single CMR setting, at block 2008, UE 2002 may determine a SINR parameter based on results of performing the channel measurement and the interference measurement based, at least in part, on the higher layer parameter. The UE 2002 may transmit determined SINR parameter 2010 to the BS 2004.

For example, when one resource setting is configured, the resource setting (e.g., given by higher layer parameter resourcesForChannelMeasurement) is for channel and interference measurement for L1-SINR computation. The UE may assume that the same 1 port NZP CSI-RS resource(s) with density 3 REs/RBs is used for both channel and interference measurements. In certain aspects, the UE may expect that the NZP CSI-RS resource set for both channel and interference measurement are configured with the higher layer parameter repetition, as described herein.

In certain aspects of the present disclosure, the higher layer parameter "repetition" may be configured for the ZP and/or NZP CSI-RS resource set in case of three resource settings. For example, ZP CSI-RS resource set may be configured in the resource setting for ZP IMR, while the NZP CSI-RS resource set may be configured in the resource setting for CMR or NZP IMR.

While FIGS. 18-20 describe examples with respect to a single CMR setting, aspects of the present disclosure may also apply to using multiple CMR settings for SINR determination.

Figure 21:
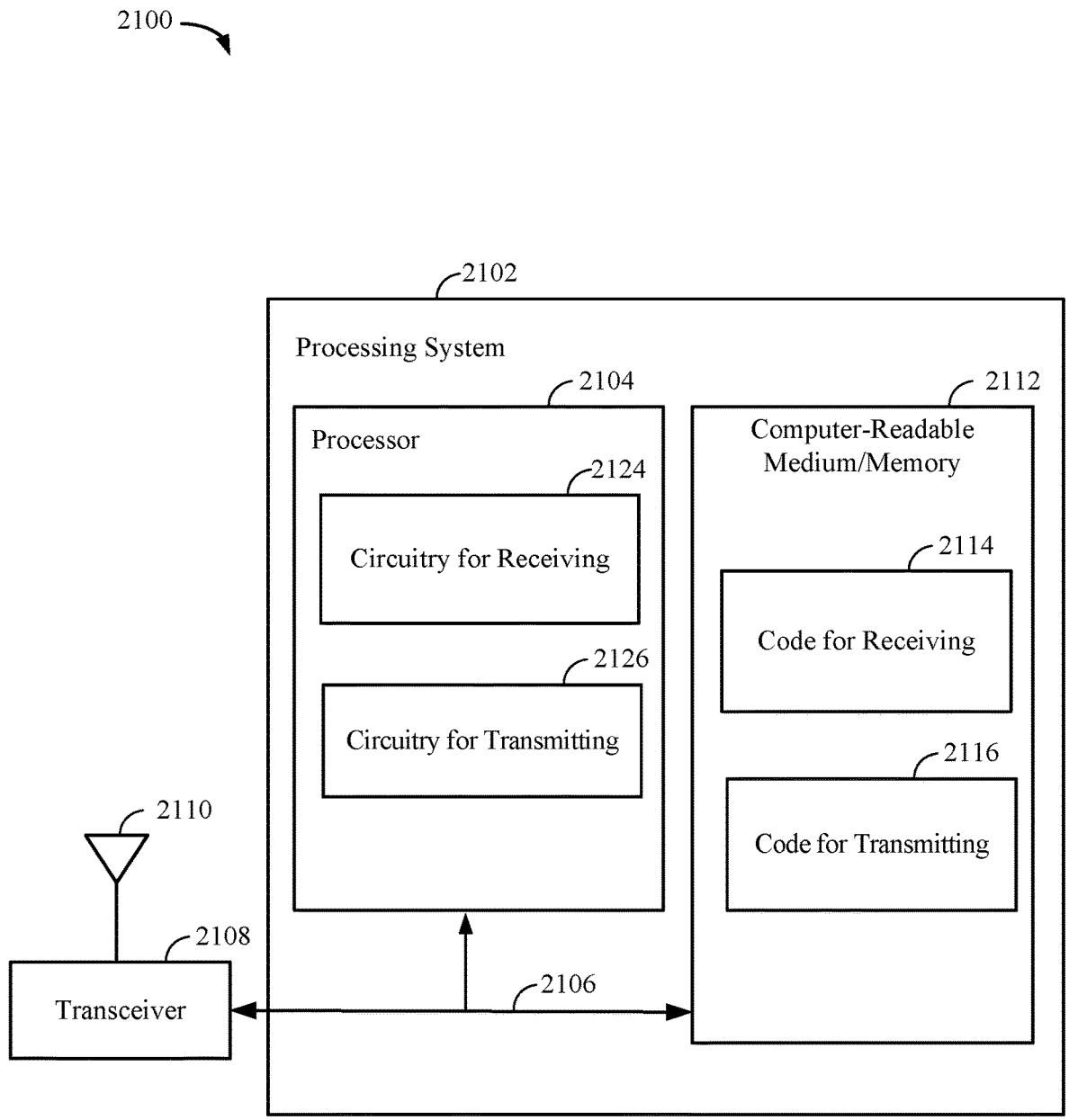
FIG. 21 illustrates a communications device that may include various components configured to perform operations for the techniques disclosed herein in accordance with aspects of the present disclosure.

FIG. 21 illustrates a communications device 2100 that may include various components (e.g., corresponding to means-plus-function components) configured to perform operations for the techniques disclosed herein, such as the operations illustrated in FIG. 3. The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/memory 2112 is configured to store instructions (e.g., computer-executable code) that when executed by the processor 2104, cause the processor 2104 to perform the operations illustrated in FIG. 3, or other operations for performing the various techniques discussed herein for determination of SINR. In certain aspects, computer-readable medium/memory 2112 stores code 2114 (e.g., an example of means for) for receiving (e.g., for receiving, an indication that a UE is configured with at least one capability to support a combination of a CMR and at least one IMR, when group based beam reporting is configured at the UE or for receiving at least one SINR parameter determined based on results of the UE performing the channel measurement and the interference measurement) and code 2116 (e.g., an example of means for) for transmitting (e.g., for transmitting, based, at least in part, on the capability of the UE, an RS resource setting for the CMR for the UE to perform channel measurement or for transmitting, based, at least in part, on the capability of the UE, at least one RS resource setting for the at least one IMR for the UE to perform interference measurement). In certain aspects, the processor 2104 has circuitry configured to implement the code stored in the computer-readable medium/memory 2112. The processor 2104 includes circuitry 2124 (e.g., an example of means for) for receiving (e.g., for receiving, an indication that a UE is configured with at least one capability to support a combination of a CMR and at least one IMR, when group based beam reporting is configured at the UE or for receiving at least one SINR parameter determined based on results of the UE performing the channel measurement and the interference measurement) and code 2126 (e.g., an example of means for) for transmitting (e.g., for transmitting, based, at least in part, on the capability of the UE, an RS resource setting for the CMR for the UE to perform channel measurement or for transmitting, based, at least in part, on the capability of the UE, at least one RS resource setting for the at least one IMR for the UE to perform interference measurement).

Figure 22:
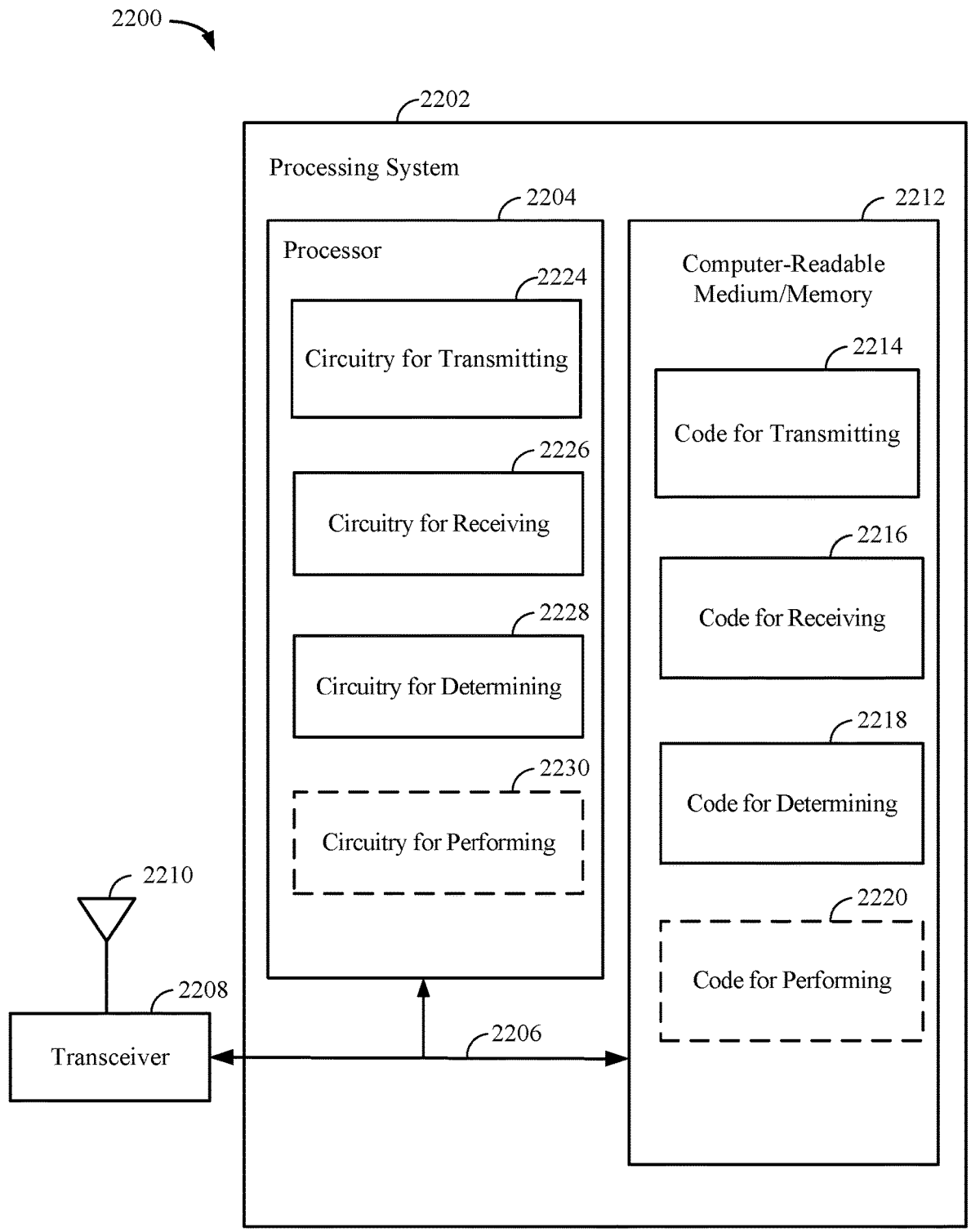
FIG. 22 illustrates a communications device that may include various components configured to perform operations for the techniques disclosed herein in accordance with aspects of the present disclosure.

FIG. 22 illustrates a communications device 2200 that may include various components (e.g., corresponding to means-plus-function components) configured to perform operations for the techniques disclosed herein, such as the operations illustrated in FIG. 4. The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIG. 4, or other operations for performing the various techniques discussed herein for determination of SINR. In certain aspects, computer-readable medium/memory 2212 stores code 2214 (e.g., an example of means for) for transmitting (e.g., for transmitting, to a BS, an indication that the UE is configured with at least one capability to support a combination of a CMR and at least one IMR, if group based beam reporting is configured or for transmitting the SINR parameter to the BS); code 2216 (e.g., an example of means for) for receiving (e.g., for receiving an RS resource setting for the CMR to perform channel measurement based, at least in part, on the capability of the UE or for receiving at least one RS resource setting for the at least one IMR to perform interference measurement based, at least in part, on the capability of the UE); code 2218 (e.g., an example of means for) for determining (e.g., for determining at least one SINR parameter based on results of performing the channel measurement and the interference measurement or optionally for determining a QCL assumption); and optional code 2220 (e.g., an example of means for) for performing (e.g., for performing channel measurement or for performing interference measurement). In certain aspects, the processor 2204 has circuitry configured to implement the code stored in the computer-readable medium/memory 2212. The processor 2204 includes circuitry 2224 (e.g., an example of means for) for transmitting (e.g., for transmitting, to a BS, an indication that the UE is configured with at least one capability to support a combination of a CMR and at least one IMR, if group based beam reporting is configured or for transmitting the SINR parameter to the BS); circuitry 2226 (e.g., an example of means for) for receiving (e.g., for receiving an RS resource setting for the CMR to perform channel measurement based, at least in part, on the capability of the UE or for receiving at least one RS resource setting for the at least one IMR to perform interference measurement based, at least in part, on the capability of the UE); circuitry 2228 (e.g., an example of means for) for determining (e.g., for determining at least one SINR parameter based on results of performing the channel measurement and the interference measurement or optionally for determining a QCL assumption); and optional circuitry 2230 (e.g., an example of means for) for performing (e.g., for performing channel measurement or for performing interference measurement).

The transceiver 2108 or 2208 may provide a means for receiving or transmitting information such as packets, user data, or control information associated with various information channels (e.g., control channels, data channels, and information related to SR, etc.). Information may be passed on to other components of the device 2100 or 2200. The transceiver 2108 or 2208 may be an example of aspects of the transceiver 254 or 232 described with reference to FIG. 2. The antenna 2110 or 2210 may correspond to a single antenna or a set of antennas. The transceiver 2108 or 2208 may provide means for transmitting signals generated by other components of the device 2100 or 2200.

The SINR manager 112 or 122 may support wireless communication in accordance with examples as disclosed herein.

The SINR manager 112 or 122 may be an example of means for performing various aspects described herein. The SINR manager 112 or 122, or its sub-components, may be implemented in hardware (e.g., in uplink resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the SINR manager 112 or 122, or its sub-components, may be implemented in code (e.g., as configuration management software or firmware) executed by a processor, or any combination thereof. If implemented in code executed by a processor, the functions of the SINR manager 112 or 122, or its sub-components may be executed by a general-purpose processor, a DSP, an ASIC, a FPGA or other programmable logic device.

In some examples, the SINR manager 112 or 122 may be configured to perform various operations (e.g., receiving, determining, transmitting) using or otherwise in cooperation with the transceiver 2108 or 2208.

The SINR manager 112 or 122, or its sub-components, may be physically located at various positions, including being distributed such that portions of functions are implemented at different physical locations by one or more physical components. In some examples, the SINR manager 112 or 122, or its sub-components, may be a separate and distinct component in accordance with various aspects of the present disclosure. In some examples, the SINR manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1. A method for wireless communication by a user equipment (UE), comprising: transmitting, to a base station (BS), an indication that the UE is configured with at least one capability to support a combination of a channel measurement resource (CMR) and at least one interference measurement resource (IMR), if group based beam reporting is configured; receiving a reference signal (RS) resource setting for the CMR to perform channel measurement based, at least in part, on the capability of the UE; receiving at least one RS resource setting for the at least one IMR to perform interference measurement based, at least in part, on the capability of the UE; determining at least one signal-to-interference-plus-noise ratio (SINR) parameter based on results of performing the channel measurement and the interference measurement; and transmitting the SINR parameter to the BS.

Clause 2. The method of Clause 1, wherein the at least one IMR comprises a zero power (ZP) IMR and a non-zero power (NZP) IMR, and wherein the indication that the UE is configured with the at least one capability comprises an indication that the UE supports one or both of: a synchronization signal block (SSB) being configured for the CMR, a ZP channel state information (CSI)-RS being configured for the ZP IMR, and an NZP CSI-RS being configured for the NZP IMR; and an NZP CSI-RS being configured for the CMR, a ZP CSI-RS being configured for the ZP IMR, and an NZP CSI-RS being configured for the NZP IMR, wherein the RS resource setting for the CMR and the RS resource setting for the at least one IMR is based, at least in part, on the at least one capability.

Clause 3. The method of Clause 1 or 2, wherein the indication that the UE is configured with at least one capability comprises an indication that the UE supports one or any combination of: at least one non-zero power (NZP) channel state information (CSI)-RS being configured for the CMR and the at least one IMR; a synchronization signal block (SSB) being configured for the CMR and an NZP CSI-RS being configured for the at least one IMR; the SSB being configured for the CMR and a zero power (ZP) CSI-RS being configured for the at least one IMR; the SSB being configured for the CMR, the NZP CSI-RS being configured for the at least one IMR and the ZP CSI-RS for the at least one IMR; the NZP CSI-RS being configured for the CMR and the NZP CSI-RS being configured for the at least one IMR; the NZP CSI-RS being configured for the CMR and the ZP CSI-RS being configured for the at least one IMR; and the NZP CSI-RS being configured for the CMR, the NZP CSI-RS being configured for the at least one IMR, and the ZP CSI-RS being configured for the at least one IMR, wherein the RS resource setting for the CMR and the RS resource setting for the at least one IMR is based, at least in part, on the at least one capability.

Clause 4. The method of any of Clauses 1-3, wherein the RS resource setting for the CMR comprises a first non-zero power (NZP) channel state information (CSI)-RS resource setting and the RS resource setting for the at least one IMR comprises a zero power (ZP) CSI-RS resource setting and a second NZP CSI-RS resource setting.

Clause 5. A method for wireless communication by a base station (BS), comprising: receiving, an indication that a user equipment (UE) is configured with at least one capability to support a combination of a channel measurement resource (CMR) and at least one interference measurement resource (IMR), if group based beam reporting is configured at the UE; transmitting, based, at least in part, on the capability of the UE, a reference signal (RS) resource setting for the CMR for the UE to perform channel measurement; transmitting, based, at least in part, on the capability of the UE, at least one RS resource setting for the at least one IMR for the UE to perform interference measurement; and receiving at least one signal-to-interference-plus-noise ratio (SINR) parameter determined based on results of the UE performing the channel measurement and the interference measurement.

Clause 6. The method of Clause 5, wherein the at least one IMR comprises a zero power (ZP) IMR and a non-zero power (NZP) IMR, and wherein the indication that the UE is configured with the at least one capability comprises an indication that the UE supports one or both of: a synchronization signal block (SSB) being configured for the CMR, a ZP channel state information (CSI)-RS being configured for the ZP IMR, and an NZP CSI-RS being configured for the NZP IMR; and an NZP CSI-RS being configured for the CMR, a ZP CSI-RS being configured for the ZP IMR, and an NZP CSI-RS being configured for the NZP IMR, wherein the RS resource setting for the CMR and the RS resource setting for the at least one IMR is based, at least in part, on the at least one capability.

Clause 7. The method of Clause 5 or 6, wherein the indication that the UE is configured with the at least one capability comprises an indication that the UE supports one or any combination of: at least one non-zero power (NZP) channel state information (CSI)-RS being configured for the CMR and the at least one IMR; a synchronization signal block (SSB) being configured for the CMR and an NZP CSI-RS being configured for the at least one IMR; the SSB being configured for the CMR and a zero power (ZP) CSI-RS being configured for the at least one IMR; the SSB being configured for the CMR, the NZP CSI-RS being configured for the at least one IMR and the ZP CSI-RS for the at least one IMR; the NZP CSI-RS being configured for the CMR and the NZP CSI-RS being configured for the at least one IMR; the NZP CSI-RS being configured for the CMR and the ZP CSI-RS being configured for the at least one IMR; and the NZP CSI-RS being configured for the CMR, the NZP CSI-RS being configured for the at least one IMR, and the ZP CSI-RS being configured for the at least one IMR, wherein the RS resource setting for the CMR and the RS resource setting for the at least one IMR is based, at least in part, on the at least one capability.

Clause 8. The method of any of Clauses 5-7, wherein the RS resource setting for the CMR comprises a first non-zero power (NZP) channel state information (CSI)-RS resource setting and the RS resource setting for the at least one IMR comprises a zero power (ZP) CSI-RS resource setting and a second NZP CSI-RS resource setting.

Clause 9. A method for wireless communication by a user equipment (UE), comprising: receiving, from a base station (BS), a first non-zero power (NZP) reference signal (RS) resource setting indicating at least one channel measurement resource (CMR) to perform channel measurement, a zero power (ZP) RS resource setting indicating at least one ZP interference measurement resource (IMR) to perform ZP interference measurement, and a second NZP RS resource setting indicating at least one NZP IMR to perform NZP interference measurement; determining a quasi-co location (QCL) assumption for the at least one ZP IMR and the at least one NZP IMR, based on an RS configured for the at least one CMR; determining at least one signal-to-interference-plus-noise ratio (SINR) parameter based on results of performing the channel measurement, the ZP interference measurement based, at least in part, on the QCL assumption, and the NZP interference measurement based, at least in part, on the QCL assumption; and transmitting the SINR parameter to the BS.

Clause 10. The method of Clause 9, wherein the RS configured for the at least one CMR comprises a synchronization signal block (SSB).

Clause 11. The method of Clause 9 or 10, wherein the QCL assumption comprises a spatial QCL assumption.

Clause 12. The method of any of Clauses 9-11, wherein the RS configured for the at least one CMR comprises a QCL source of the at least one CMR.

Clause 13. A method for wireless communication by a base station (BS), comprising: transmitting, to a user equipment (UE), a first non-zero power (NZP) reference signal (RS) resource setting indicating at least one channel measurement resource (CMR), a zero power (ZP) RS resource setting indicating at least one ZP interference measurement resource (IMR), and a second NZP RS resource setting indicating at least one NZP IMR, wherein a quasi-co location (QCL) assumption for the at least one ZP IMR and the at least one NZP IMR is determined based on an RS configured for the at least one CMR; and receiving at least one signal-to-interference-plus-noise ratio (SINR) parameter based on results of channel measurement performed based on the at least one CMR, ZP interference measurement performed based, at least in part, on the at least one ZP IMR and the QCL assumption, and NZP interference measurement performed based, at least in part, on the at least one NZP IMR and the QCL assumption.

Clause 14. The method of Clause 13, wherein the RS comprises a synchronization signal block (SSB).

Clause 15. The method of Clause 13 or 14, wherein the QCL assumption comprises a spatial QCL assumption.

Clause 16. The method of any of Clauses 13-15, wherein the RS configured for the at least one CMR comprises a QCL source of the at least one CMR.

Clause 17. A method for wireless communication by a user equipment (UE), comprising: receiving, from a base station (BS), a first non-zero power (NZP) reference signal (RS) resource setting indicating at least one channel measurement resource (CMR) to perform channel measurement, a zero power (ZP) RS resource setting indicating at least one ZP interference measurement resource (IMR) to perform ZP interference measurement, and a second NZP RS resource setting indicating at least one NZP IMR to perform NZP interference measurement, the first NZP RS resource setting indicating the same number of resources as the second NZP RS resource setting; determining at least one signal-to-interference-plus-noise ratio (SINR) parameter based on results of performing the channel measurement, the ZP interference measurement, and the NZP interference measurement; and transmitting the at least one SINR parameter to the BS.

Clause 18. The method of Clause 17, wherein the first NZP RS resource setting, the ZP RS resource setting, and the second NZP RS resource setting indicate the same number of resources.

Clause 19. A method for wireless communication by a base station (BS), comprising: transmitting, to a user-equipment (UE), a first non-zero power (NZP) reference signal (RS) resource setting indicating at least one channel measurement resource (CMR), a zero power (ZP) RS resource setting indicating at least one ZP interference measurement resource (IMR), and a second NZP RS resource setting indicating at least one NZP IMR, the first NZP RS resource setting indicating the same number of resources as the second NZP RS resource setting; and receiving at least one signal-to-interference-plus-noise ratio (SINR) parameter based on results of channel measurement performed based on the at least one CMR, ZP interference measurement performed based on the at least one ZP IMR, and NZP interference measurement performed based on the at least one NZP IMR.

Clause 20. The method of Clause 19, wherein the first NZP RS resource setting, the ZP RS resource setting, and the second NZP RS resource setting indicate the same number of resources.

Clause 21. A method for wireless communication by a user equipment (UE), comprising: receiving, from a base station (BS), a first non-zero power (NZP) reference signal (RS) resource setting indicating at least one channel measurement resource (CMR), a zero power (ZP) RS resource setting indicating at least one ZP interference measurement resource (IMR), and a second NZP RS resource setting indicating multiple NZP IMRs, the CMR or the ZP IMR comprising a common resource that is common for determination of at least one signal-to-interference-plus-noise ratio (SINR) parameter; determining the at least one SINR parameter based on the common resource; and transmitting the at least one SINR parameter to the BS.

Clause 22. The method of Clause 21, wherein: the at least one CMR comprises multiple CMRs; determining the at least one SINR parameter comprises determining each of multiple SINR parameters based on a respective one of the multiple CMRs and a respective one of the multiple NZP IMRs, the multiple CMRs and the multiple NZP IMRs having the same number of resources; and the at least one ZP IMR comprises the common resource.

Clause 23. The method of Clause 21 or 22, wherein: the at least one ZP IMR comprises multiple ZP IMRs; determining the at least one SINR parameter comprises determining an SINR parameter based on the multiple ZP IMRs and the multiple NZP IMRs; and the at least one CMR comprises the common resource.

Clause 24. The method of Clause 23, wherein the multiple ZP IMRs and the multiple NZP IMRs have different number of resources.

Clause 25. A method for wireless communication by a base station (BS), comprising: transmitting, to a user equipment (UE), a first non-zero power (NZP) reference signal (RS) resource setting indicating at least one channel measurement resource (CMR), a zero power (ZP) RS resource setting indicating at least one ZP interference measurement resource (IMR), and a second NZP RS resource setting indicating multiple NZP IMRs, the CMR or the ZP IMR comprising a common resource that is common for determination of at least one signal-to-interference-plus-noise ratio (SINR) parameter; and receiving the at least one SINR parameter determined based on the common resource.

Clause 26. The method of Clause 25, wherein: the at least one CMR comprises multiple CMRs; the at least one SINR parameter comprises multiple SINR parameters, each of the multiple SINR parameters is to be determined based on a respective one the multiple CMRs and a respective one of the multiple NZP IMRs, the multiple CMRs and the multiple NZP IMRs having the same number of resources; and the at least one ZP IMR comprises the common resource.

Clause 27. The method of Clause 25 or 26, wherein: the at least one ZP IMR comprises multiple ZP IMRs; the at least one SINR parameter comprises an SINR parameter determined based on the multiple ZP IMRs and the multiple NZP IMRs; and the at least one CMR comprises the common resource.

Clause 28. The method of Clause 27, wherein the multiple ZP IMRs and the multiple NZP IMRs have different number of resources.

Clause 29. A method for wireless communication by a user equipment (UE), comprising: receiving, from a base station (BS), a configuration of a single channel measurement resource (CMR) setting for performing channel measurement and interference measurement and a higher layer parameter indicating that repetition is enabled for the single CMR setting; determining a signal-to-interference-plus-noise ratio (SINR) parameter based on results of performing the channel measurement and the interference measurement based, at least in part, on the higher layer parameter; and transmitting the SINR parameter to the BS.

Clause 30. The method of Clause 29, wherein the higher layer parameter comprises a radio resource control (RRC) layer parameter.

Clause 31. The method of Clause 29 or 30, wherein the CMR setting comprises a non-zero power (NZP) channel state information (CSI)-reference signal (RS) resource setting.

Clause 32. A method for wireless communication by a base station (BS), comprising: transmitting, to a user equipment (UE), a configuration of a single channel measurement resource (CMR) setting and a higher layer parameter indicating that repetition is enabled for the single CMR setting; and receiving a signal to interference noise ratio (SINR) parameter based on results of channel measurement and interference measurement performed based, at least in part, on the single CMR setting and the higher layer parameter.

Clause 33. The method of Clause 32, wherein the higher layer parameter comprises a radio resource control (RRC) layer parameter.

Clause 34. The method of Clause 32 or 33, wherein the CMR setting comprises a non-zero power (NZP) channel state information (CSI)-reference signal (RS) resource setting.

Clause 35. An apparatus, comprising: a memory; and one or more processors coupled to the memory, the memory and the one or more processors being configured to perform a method based, at least in part, on any one of Clauses 1-34.

Clause 36. An apparatus, comprising means for performing a method based, at least in part, on any one of Clauses 1-34.

Clause 37. A non-transitory computer-readable medium comprising executable instructions that, when executed by one or more processors of an apparatus, cause the apparatus to perform a method based, at least in part, on any one of Clauses 1-34.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include determining, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3-14.

Further, it should be appreciated that modules and/or other appropriate means for performing the methods and techniques described herein can be downloaded and/or otherwise obtained by a user terminal and/or BS as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
transmitting, to a base station (BS), an indication that the UE is configured with at least one capability to support a combination of a channel measurement resource (CMR) and at least one interference measurement resource (IMR), when group based beam reporting is configured, wherein the indication indicates that the UE is configured with the at least one capability to support the combination of the CMR and the at least one IMR based on whether the group based beam reporting is enabled or disabled, wherein the indication that the UE is configured with the at least one capability comprises an indication that the UE supports at least:
a non-zero power (NZP) channel state information (CSI) reference signal (RS) being configured for the CMR, and a zero power (ZP) CSI-RS or a NZP CSI-RS being configured for the at least one IMR;
receiving an RS resource setting for the CMR to perform channel measurement based, at least in part, on the capability of the UE;
receiving at least one RS resource setting for the at least one IMR to perform interference measurement based, at least in part, on the capability of the UE;
determining at least one signal-to-interference-plus-noise ratio (SINR) parameter based on results of performing the channel measurement and the interference measurement; and
transmitting the SINR parameter to the BS.

2. The method of claim 1, wherein the indication that the UE is configured with the at least one capability further comprises an indication that the UE supports a synchronization signal block (SSB) being configured for the CMR, and the ZP CSI-RS and the NZP CSI-RS being configured for the at least one IMR.

3. The method of claim 1, wherein the indication that the UE is configured with the at least one capability further comprises an indication that the UE supports the NZP CSI-RS being configured for the CMR and the at least one IMR.

4. The method of claim 1, wherein the indication that the UE is configured with the at least one capability further comprises an indication that the UE supports a first NZP CSI-RS resource setting for the CMR and a second NZP CSI-RS resource setting for the at least one IMR.

5. The method of claim 1, wherein the indication that the UE is configured with the at least one capability further comprises an indication that the UE supports a synchronization signal block (SSB) being configured for the CMR and the NZP CSI-RS being configured for the at least one IMR.

6. The method of claim 1, wherein the indication that the UE is configured with the at least one capability further comprises an indication that the UE supports a synchronization signal block (SSB) being configured for the CMR and the ZP CSI-RS being configured for the at least one IMR.

7. A method for wireless communication by a base station (BS), comprising:
receiving an indication that a user equipment (UE) is configured with at least one capability to support a combination of a channel measurement resource (CMR) and at least one interference measurement resource (IMR), when group based beam reporting is configured at the UE, wherein the indication indicates that the UE is configured with the at least one capability to support the combination of the CMR and the at least one IMR based on whether the group based beam reporting is enabled or disabled, wherein the indication that the UE is configured with the at least one capability comprises an indication that the UE supports at least:
a non-zero power (NZP) channel state information (CSI) reference signal (RS) being configured for the CMR, and a zero power (ZP) CSI-RS or a NZP CSI-RS being configured for the at least one IMR;
transmitting, based, at least in part, on the capability of the UE, an RS resource setting for the CMR for the UE to perform channel measurement;
transmitting, based, at least in part, on the capability of the UE, at least one RS resource setting for the at least one IMR for the UE to perform interference measurement; and
receiving at least one signal-to-interference-plus-noise ratio (SINR) parameter determined based on results of the UE performing the channel measurement and the interference measurement.

8. The method of claim 7, wherein the indication that the UE is configured with the at least one capability further comprises an indication that the UE supports a synchronization signal block (SSB) being configured for the CMR, and the ZP CSI-RS and the NZP CSI-RS being configured for the at least one IMR.

9. The method of claim 7, wherein the indication that the UE is configured with the at least one capability further comprises an indication that the UE supports the NZP CSI-RS being configured for the CMR and the at least one IMR.

10. The method of claim 7, wherein the indication that the UE is configured with the at least one capability further comprises an indication that the UE supports a first NZP CSI-RS resource setting for the CMR and a second NZP CSI-RS resource setting for the at least one IMR.

11. The method of claim 7, wherein the indication that the UE is configured with the at least one capability further comprises an indication that the UE supports a synchronization signal block (SSB) being configured for the CMR and the NZP CSI-RS being configured for the at least one IMR.

12. The method of claim 7, wherein the indication that the UE is configured with the at least one capability further comprises an indication that the UE supports a synchronization signal block (SSB) being configured for the CMR and the ZP CSI-RS being configured for the at least one IMR.

13. An apparatus for wireless communication by a user equipment (UE), comprising:
a memory; and
one or more processors coupled to the memory, the memory and the one or more processors being configured to:
transmit, to a base station (BS), an indication that the UE is configured with at least one capability to support a combination of a channel measurement resource (CMR) and at least one interference measurement resource (IMR), when group based beam reporting is configured, wherein the indication indicates that the UE is configured with the at least one capability to support the combination of the CMR and the at least one IMR based on whether the group based beam reporting is enabled or disabled, wherein the indication that the UE is configured with the at least one capability comprises an indication that the UE supports at least:
a non-zero power (NZP) channel state information (CSI) reference signal (RS) being configured for the CMR, and a zero power (ZP) CSI-RS or a NZP CSI-RS being configured for the at least one IMR;
receive an RS resource setting for the CMR to perform channel measurement based, at least in part, on the capability of the UE;
receive at least one RS resource setting for the at least one IMR to perform interference measurement based, at least in part, on the capability of the UE;
determine at least one signal-to-interference-plus-noise ratio (SINR) parameter based on results of performing the channel measurement and the interference measurement; and
transmit the SINR parameter to the BS.

14. The apparatus of claim 13, wherein the indication that the UE is configured with the at least one capability further comprises an indication that the UE supports a synchronization signal block (SSB) being configured for the CMR, and the ZP CSI-RS and the NZP CSI-RS being configured for the at least one IMR.

15. The apparatus of claim 13, wherein the indication that the UE is configured with the at least one capability further comprises an indication that the UE supports at least one NZP CSI-RS being configured for the CMR and the at least one IMR.

16. The apparatus of claim 13, wherein the indication that the UE is configured with the at least one capability further comprises an indication that the UE supports a first NZP CSI-RS resource setting for the CMR and a second NZP CSI-RS resource setting for the at least one IMR.

17. The apparatus of claim 13, wherein the indication that the UE is configured with the at least one capability further comprises an indication that the UE supports a synchronization signal block (SSB) being configured for the CMR and the NZP CSI-RS being configured for the at least one IMR.

18. The apparatus of claim 13, wherein the indication that the UE is configured with the at least one capability further comprises an indication that the UE supports a synchronization signal block (SSB) being configured for the CMR and the ZP CSI-RS being configured for the at least one IMR.

19. An apparatus for wireless communication by a base station (BS), comprising:
a memory; and
one or more processors coupled to the memory, the memory and the one or more processors being configured to:
receive, an indication that a user equipment (UE) is configured with at least one capability to support a combination of a channel measurement resource (CMR) and at least one interference measurement resource (IMR), when group based beam reporting is configured at the UE, wherein the indication indicates that the UE is configured with the at least one capability to support the combination of the CMR and the at least one IMR based on whether the group based beam reporting is enabled or disabled, wherein the indication that the UE is configured with the at least one capability comprises an indication that the UE supports at least:
- a non-zero power (NZP) channel state information (CSI) reference signal (RS) being configured for the CMR, a zero power (ZP) CSI-RS or a NZP CSI-RS being configured for the at least one IMR;

transmit, based, at least in part, on the capability of the UE, an RS resource setting for the CMR for the UE to perform channel measurement;

transmit, based, at least in part, on the capability of the UE, at least one RS resource setting for the at least one IMR for the UE to perform interference measurement; and receive at least one signal-to-interference-plus-noise ratio (SINR) parameter determined based on results of the UE performing the channel measurement and the interference measurement.

20. The apparatus of claim 19, wherein the indication that the UE is configured with the at least one capability further comprises an indication that the UE supports a synchronization signal block (SSB) being configured for the CMR, and the ZP CSI-RS and the NZP CSI-RS being configured for the at least one IMR.

21. The apparatus of claim 19, wherein the indication that the UE is configured with the at least one capability further comprises an indication that the UE supports at least one NZP CSI-RS being configured for the CMR and the at least one IMR.

22. The apparatus of claim 19, wherein the indication that the UE is configured with the at least one capability further comprises an indication that the UE supports a first NZP CSI-RS resource setting for the CMR and a second NZP CSI-RS resource setting for the at least one IMR.

23. The apparatus of claim 19, wherein the indication that the UE is configured with the at least one capability further comprises an indication that the UE supports a synchronization signal block (SSB) being configured for the CMR and the NZP CSI-RS being configured for the at least one IMR.

24. The apparatus of claim 19, wherein the indication that the UE is configured with the at least one capability further comprises an indication that the UE supports a synchronization signal block (SSB) being configured for the CMR and the ZP CSI-RS being configured for the at least one IMR.

* * * * *